US012809125B2

(12) United States Patent
Huh et al.

(10) Patent No.: US 12,809,125 B2
(45) Date of Patent: Nov. 24, 2026

(54) OPTICAL IMAGING SYSTEM

(71) Applicant: SAMSUNG ELECTRO-MECHANICS CO., LTD., Suwon-si (KR)

(72) Inventors: Jae Hyuk Huh, Suwon-si (KR); You Jin Jeong, Suwon-si (KR); Byung Hyun Kim, Suwon-si (KR); So Mi Yang, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 233 days.

(21) Appl. No.: 18/733,436

(22) Filed: Jun. 4, 2024

(65) Prior Publication Data

US 2024/0319478 A1 Sep. 26, 2024

Related U.S. Application Data

(63) Continuation of application No. 18/365,628, filed on Aug. 4, 2023, now Pat. No. 12,038,622.

(30) Foreign Application Priority Data

Nov. 11, 2022 (KR) ........................ 10-2022-0150877
Mar. 16, 2023 (KR) ........................ 10-2023-0034745

(51) Int. Cl.
*G02B 9/60* (2006.01)
*G02B 13/18* (2006.01)

(52) U.S. Cl.
CPC ............... *G02B 9/60* (2013.01); *G02B 13/18* (2013.01)

(58) Field of Classification Search
CPC ...... G02B 9/60; G02B 13/18; G02B 13/0065; G02B 13/0045
See application file for complete search history.

(56) References Cited

U.S. PATENT DOCUMENTS 10,261,291 B2 4/2019 Shih
10,802,251 B2 10/2020 Lin et al.
(Continued)

FOREIGN PATENT DOCUMENTS

CN 113296234 A 8/2021
JP 2015-229059 A 12/2015
(Continued)

OTHER PUBLICATIONS

U.S. Appl. No. 18/365,628, filed Aug. 4, 2023, Huh et al., Samsung Electro-Mechanics Co., Inc.
(Continued)

*Primary Examiner* — Balram T Parbadia
(74) *Attorney, Agent, or Firm* — NSIP Law

(57) ABSTRACT

An optical imaging system includes a first lens having positive refractive power, a second lens having refractive power, a third lens having refractive power, a fourth lens having refractive power, a fifth lens having negative refractive power, wherein the first to fifth lenses are sequentially disposed from an object side, and a reflective member having a plurality of reflective surfaces to reflect the light refracted by the fifth lens multiple times, wherein $3<BFL/TL<7$ is satisfied, where BFL is a distance on an optical axis from an image-side surface of the fifth lens to an imaging plane, and TL is a distance on an optical axis from an object-side surface of the first lens to the image-side surface of the fifth lens.

16 Claims, 21 Drawing Sheets

(56) References Cited

U.S. PATENT DOCUMENTS

| | | | |
|---|---|---|---|
| 2002/0176058 A1 | 11/2002 | Yasui et al. | |
| 2007/0126911 A1 | 6/2007 | Nanjo | |
| 2012/0019929 A1 | 1/2012 | Fujisaki | |
| 2013/0201382 A1 | 8/2013 | Ueda et al. | |
| 2015/0358519 A1 | 12/2015 | Kamei | |
| 2018/0017767 A1 | 1/2018 | Chen | |
| 2018/0081149 A1 | 3/2018 | Bae et al. | |
| 2018/0180847 A1 | 6/2018 | Yoo | |
| 2020/0400925 A1* | 12/2020 | Lin | G02B 5/00 |
| 2021/0018725 A1 | 1/2021 | Hsu et al. | |
| 2021/0033819 A1 | 2/2021 | Lv et al. | |
| 2021/0063686 A1 | 3/2021 | Kim et al. | |
| 2021/0063703 A1 | 3/2021 | Byun et al. | |
| 2021/0072501 A1 | 3/2021 | Chang et al. | |
| 2021/0072504 A1 | 3/2021 | Yoo et al. | |
| 2021/0325641 A1 | 10/2021 | Wenren et al. | |
| 2021/0389567 A1 | 12/2021 | Teranishi et al. | |
| 2022/0050274 A1 | 2/2022 | Tang et al. | |
| 2022/0113520 A1 | 4/2022 | Kim et al. | |
| 2022/0187578 A1 | 6/2022 | Yeh et al. | |
| 2022/0229271 A1 | 7/2022 | Tseng et al. | |
| 2022/0308319 A1 | 9/2022 | Chen | |

FOREIGN PATENT DOCUMENTS

| | | | |
|---|---|---|---|
| KR | 10-1901701 | B1 | 9/2018 |
| KR | 10-2019-0088715 | A | 7/2019 |
| KR | 10-2021-0027185 | A | 3/2021 |
| KR | 10-2022-0118301 | A | 8/2022 |
| TW | 202104966 | A | 2/2021 |
| TW | 202111380 | A | 3/2021 |
| TW | 202215135 | A | 4/2022 |
| WO | WO 2021/138633 | A1 | 7/2021 |

OTHER PUBLICATIONS

Korean Office Action issued on Oct. 19, 2023, corresponds in Korean Patent Application No. 10-2023-0034745 (4 pages in English, 4 pages in Korean).

Taiwanese Office Action issued on Feb. 5, 2024, corresponds in Taiwanese Patent Application No. 112130649 (4 pages in English, 5 pages in Chinese).

Taiwanese Office Action issued on Nov. 12, 2024, in corresponding Taiwanese Patent Application No. 113138999. (4 pages in English and 5 pages in Chinese).

Taiwanese Office Action issued on Aug. 6, 2026, in counterpart Taiwanese Patent Application No. 114134837 (10 pages in English, 7 pages in Chinese).

* cited by examiner

OPTICAL IMAGING SYSTEM

CROSS-REFERENCE TO RELATED APPLICATIONS

This application is a continuation of U.S. patent application Ser. No. 18/365,628 filed on Aug. 4, 2023, now U.S. Pat. No. 12,038,622 issued on Jul. 16, 2024, which claims the benefit under 35 USC 119(a) of Korean Patent Application Nos. 10-2022-0150877, filed on Nov. 11, 2022, and 10-2023-0034745, filed on Mar. 16, 2023, in the Korean Intellectual Property Office, the entire disclosures of which are incorporated herein by reference for all purposes.

BACKGROUND

1. Field

The present disclosure relates to an optical imaging system.

2. Description of the Background

A portable terminal may include a camera including an optical lens system comprised of a plurality of lenses to make video calls and capture images.

In addition, as the function performed by a camera in a portable terminal gradually increases, demand for a camera for a portable terminal having a high resolution may increase.

For example, an image sensor having a large number of pixels (e.g., 13 million to 100 million pixels, or the like) may be adopted in a camera for a portable terminal in order to implement clearer image quality.

In addition, since the portable terminal may be miniaturized and slimmed cameras for portable terminals may be required, development of an optical imaging system capable of implementing high resolution while being slim may be desired.

For example, in the case of a camera for a portable terminal having telephoto characteristics, the optical axes of a plurality of lenses may be disposed in parallel in a length direction or width direction of the portable terminal, and a reflective member may be disposed in front of the plurality of lenses, to prevent a total track length of the optical imaging system from affecting a thickness of the portable terminal.

However, in such a structure the thickness of the portable terminal may increase as the diameters of the plurality of lenses increase.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having positive refractive power, a second lens having refractive power, a third lens having refractive power, a fourth lens having refractive power, a fifth lens having negative refractive power, wherein the first to fifth lenses are sequentially disposed from an object side, and a reflective member having a plurality of reflective surfaces to reflect light refracted by the fifth lens multiple times, wherein $3<BFL/TL<7$ is satisfied, where BFL is a distance on an optical axis from an image-side surface of the fifth lens to an imaging plane, and TL is a distance on an optical axis from an object-side surface of the first lens to the image-side surface of the fifth lens.

The conditional expression $1<TTL/BFL<2$ may be satisfied, where TTL is a distance on an optical axis from an object-side surface of the first lens to the imaging plane.

The reflective member may include an incident surface into which light refracted by the fifth lens is incident, a first reflective surface for reflecting the light, a second reflective surface for reflecting the light reflected from the first reflective surface, and an emission surface from which light reflected from the second reflective surface is emitted, wherein $PL/TTL<0.8$ may be satisfied, where PL is a distance on an optical axis from the incident surface of the reflective member to the emission surface.

The conditional expression $1.3<f/f1<2.1$ may be satisfied, where f is a total focal length of the first to fifth lenses, and f1 is a focal length of the first lens.

The conditional expression $|f1/f2|<0.6$ may be satisfied, where f2 is a focal length of the second lens.

The conditional expression $0<f1/|f23|<0.3$ may be satisfied, where f23 is a combined focal length of the second lens and the third lens.

The conditional expression $1<TTL/f<1.5$ may be satisfied.

The conditional expression $1.63<avg\_n23<1.7$ may be satisfied, where avg_n23 is an average value of a refractive index of the second lens and a refractive index of the third lens.

The conditional expression $2.7<Fno<4.6$ may be satisfied, where Fno is an F-number of the optical imaging system.

The conditional expression $9<v1-(v2+v3)<37$ may be satisfied, where v1 is an Abbe number of the first lens, v2 is an Abbe number of the second lens, and v3 is an Abbe number of the third lens.

Each of the second lens and the third lens may have a refractive index greater than 1.61 and an Abbe number less than 30.

Any one of the second lens and the third lens may have a refractive index greater than 1.66.

A difference value of Abbe numbers between the first lens and the second lens may be greater than 29, and a difference value of Abbe numbers between the second lens and the third lens may be less than 7.

The first lens may be formed of a glass material having an Abbe number greater than 80, and the second to fifth lenses may be formed of a plastic material.

The first lens may be formed of a glass material having an Abbe number greater than 80, the second lens may be formed of a glass material having an Abbe number less than 30, and the third to fifth lenses may be formed of a plastic material.

The first lens may have a convex object-side surface and a concave image-side surface, the second lens may have a convex object-side surface and a concave image-side surface, and the third lens may have a concave image-side surface and the fourth lens may have a convex object-side surface.

In another general aspect, an optical imaging system, includes a first lens having positive refractive power, a second lens having refractive power, a third lens having refractive power, a fourth lens having refractive power, a fifth lens having negative refractive power, wherein the first to fifth lenses are sequentially disposed, and a reflective member having a plurality of reflective surfaces to reflect the light refracted by the fifth lens multiple times, wherein $2.7<Fno<4.6$ is satisfied, where Fno is an F-number of the optical imaging system, and wherein $1<TTL/BFL<2$ is satisfied, where BFL is a distance on an optical axis from an image-side surface of the fifth lens to an imaging plane, and TTL is a distance on an optical axis from an object-side surface of the first lens to the imaging plane.

The conditional expression $PL/TTL<0.8$ may be satisfied.

In another general aspect, an optical imaging system includes a first lens having positive refractive power, a convex object-side surface, and a concave image-side surface, a second lens having refractive power, a convex object-side surface, and a concave image-side surface, a third lens having refractive power and a concave image-side surface, a fourth lens having refractive power and a convex object-side surface, a fifth lens having negative refractive power and a concave image-side surface, wherein the first to fifth lenses are sequentially disposed, and a reflective member having a plurality of reflective surfaces to reflect the light refracted by the fifth lens multiple times, wherein $1.3<f/f1<2.1$ is satisfied, where f is a total focal length of the first to fifth lenses, and f1 is a focal length of the first lens.

The conditional expression $3<BFL/TL<7$ may be satisfied.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
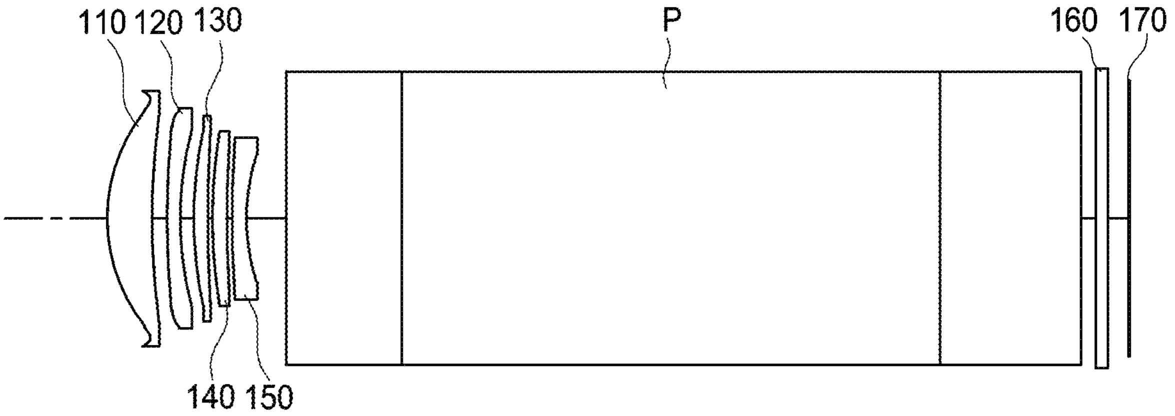
FIG. 1 is a configuration diagram of an optical imaging system according to a first embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide an optical imaging system capable of realizing a small size and high resolution.

In the following lens configuration diagrams, the thickness, size, and shape of the lenses may be illustrated in a somewhat exaggerated manner for explanatory purposes, and in particular, the spheric or aspherical shape presented in the lens configuration diagram is only presented as an example, and is not limited thereto.

An optical imaging system according to an embodiment of the present disclosure may include a plurality of lenses disposed in an optical axis. Each of the plurality of lenses may be disposed to be spaced apart from each other by a predetermined distance along the optical axis. For example, the optical imaging system may include five lenses.

Among the lenses comprising the optical imaging system, a frontmost lens means a lens closest to an object side, and a rearmost lens means a lens closest to a reflective member.

For example, in an embodiment comprised of five lenses, the first lens refers to a lens closest to the object side, and the fifth lens refers to a lens closest to the reflective member.

In addition, in each lens, the first surface means a surface closest to an object side (or object-side surface), and the second surface means a surface closest to an image side (or image-side surface). In addition, in the present specification, all numerical values of a radius of curvature, thickness, distance, focal length, and the like, are represented in millimeters, and a unit of a field of view (FOV) is represented in degrees.

In addition, in the present specification, in an explanation of a shape of each lens, a convex shape on one surface may mean that a paraxial region of the surface is convex, and a concave shape on one surface may mean that a paraxial region of the surface is concave. Therefore, even when one surface of the lens is described as having a convex shape, an edge portion of the lens may be concave. Similarly, even when one surface of the lens is described as having a concave shape, an edge portion of the lens may be convex.

Meanwhile, the paraxial region refers to a very narrow region near and including an optical axis.

The imaging plane may refer to an imaginary plane on which a focus is formed by an optical imaging system. Alternatively, the imaging plane may refer to one surface of an image sensor through which light is received. The imaging plane may be a plane perpendicular to an optical axis of the optical imaging system.

An optical imaging system according to an embodiment of the present disclosure includes five lenses.

For example, an optical imaging system according to an embodiment of the present disclosure includes a first lens, a second lens, a third lens, a fourth lens, and a fifth lens sequentially disposed from an object side. Each of the first to fifth lenses is disposed to be spaced apart from each other by a predetermined distance along a first optical axis.

However, the optical imaging system according to an embodiment of the present disclosure is not comprised of only 5 lenses and may further include other components.

For example, the optical imaging system may further include a reflective member having a plurality of reflective surfaces for changing an optical path. Each reflective surface of the reflective member may be configured to change the optical path by 90° (degrees).

The reflective member may be disposed to the rear of the plurality of lenses. For example, the reflective member may be disposed between the fifth lens and an imaging plane (or image sensor). The reflective member may be a mirror or prism having a plurality of reflective surfaces.

Figure 21:
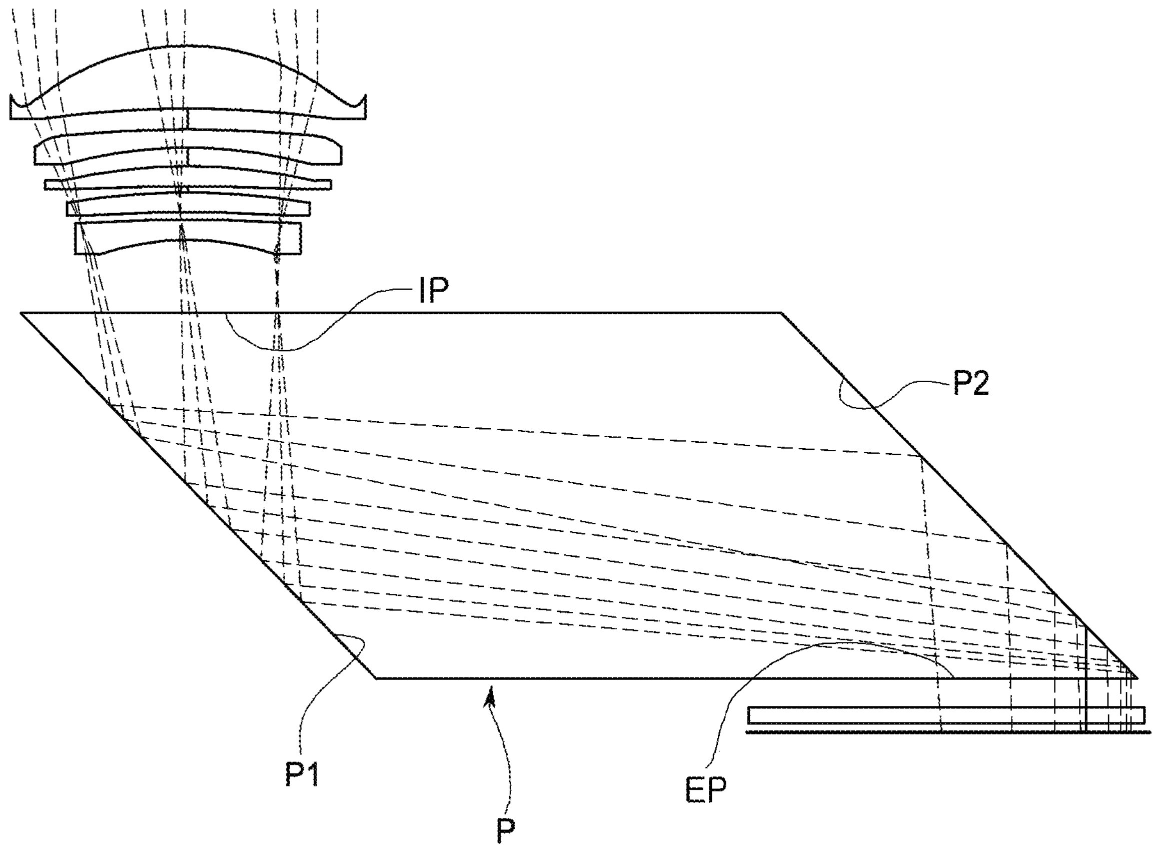
FIG. 21 is a diagram of the optical imaging system illustrated in FIG. 1 viewed from another angle.

Referring to FIG. 21, when the reflective member P is a prism, the prism includes an incident surface IP on which light is incident, a first reflective surface P1 for reflecting the light passing through the incident surface IP, a second reflective surface P2 for reflecting the light reflected by the reflective surface P1, and an emission surface EP from which light is emitted. For example, the prism may be configured to have a parallelogram shape when viewed from a side.

The light passing through the first to fifth lenses may pass through the incident surface of the reflective member, and the optical path may be changed by 90° on the first reflective surface, and the light path may be changed by 90° on the second reflective surface, and the light can pass through the emission surface of the reflective member and be incident on the imaging plane.

The optical imaging system may further include an image sensor for converting an incident image of a subject into an electrical signal.

In addition, the optical imaging system may further include an infrared cut-off filter (hereinafter, referred to as a 'filter') for blocking infrared rays. A filter is disposed between the reflective member and the imaging plane.

In addition, the optical imaging system may further include a stop for adjusting an amount of light.

An effective radius of the first lens may be larger than that of other lenses. That is, among the first to fifth lenses, the first lens may have the largest effective radius.

A portion of the plurality of lenses have at least one aspherical surface.

For example, at least one of the first and second surfaces of the fourth lens and the fifth lens may be aspherical. Here, the aspherical surface of each lens may be expressed by Equation 1.

$$Z = \frac{cY^2}{1 + \sqrt{1 - (1+K)c^2Y^2}} + AY^4 + BY^6 + CY^8 + DY^{10} \quad \text{Equation 1}$$

In Equation 1, c is a curvature of the lens (a reciprocal of a radius of curvature), K is a conic constant, and Y is a distance from an arbitrary point on an aspherical surface of the lens to an optical axis. In addition, constants A to D mean aspherical surface coefficients. Z(SAG) represents a distance in a direction of the optical axis between an arbitrary point on an aspherical surface of the lens and a vertex of the aspherical surface.

An optical imaging system according to an embodiment of the present disclosure may satisfy at least one of the following conditional expressions.

$$1.3 < f/f1 < 2.1 \quad \text{(Conditional expression 1)}$$

$$1 < TTL/f < 1.5 \quad \text{(Conditional expression 2)}$$

$$PL/TTL < 0.8 \quad \text{(Conditional expression 3)}$$

$$0.6 < PL/TTL < 0.8 \quad \text{(Conditional expression 4)}$$

$$|f1/f2| < 0.6 \quad \text{(Conditional expression 5)}$$

$$0 < f1/|f23| < 0.3 \quad \text{(Conditional expression 6)}$$

$$1.63 < \text{avg\_n23} < 1.7 \quad \text{(Conditional expression 7)}$$

$$1 < TTL/BFL < 2 \quad \text{(Conditional expression 8)}$$

$$3 < BFL/TL < 7 \quad \text{(Conditional expression 9)}$$

$$2.7 < Fno < 4.6 \quad \text{(Conditional expression 10)}$$

$$9 < v1 - (v2 + v3) < 37 \quad \text{(Conditional expression 11)}$$

In the conditional expressions, f is a total focal length of the optical imaging system, f1 is a focal length of the first lens, f2 is a focal length of the second lens, and f23 is a combined focal length of the first and second lenses.

TTL is a distance on an optical axis from an object-side surface of the first lens to an imaging plane, and PL is a distance on an optical axis from an incident surface to an emission surface of the reflective member.

BFL is a distance on an optical axis from an image-side surface of the fifth lens to an imaging plane, and TL is a distance on an optical axis from an object-side surface of the first lens to the image-side surface of the fifth lens.

Fno is a F-number of the optical imaging system, v1 is an Abbe number of the first lens, v2 is an Abbe number of the second lens, and v3 is an Abbe number of the third lens.

In the present specification, TTL may mean a sum of a distance between an object-side surface of the first lens and a first reflective surface of the reflective member, a distance between a first reflective surface and a second reflective surface of the reflective member, and a distance between a second reflective surface of the reflective member and an imaging plane. BFL may mean a sum of a distance between an image-side surface of the fifth lens and a first reflective surface of the reflective member, a distance between a first reflective surface and a second reflective surface of the reflective member, and a distance between a second reflective surface of the reflective member and an imaging plane, and PL may mean a sum of a distance between an incident surface and a first reflective surface of the reflective member, a distance between a first reflective surface and a second reflective surface, and a distance between a second reflective surface and an emission surface.

In one or more examples, at least two lenses disposed in succession may be high refractive lenses. For example, each of the second lens and the third lens has a refractive index greater than 1.61. For example, any one of the at least two high refractive lenses disposed in succession has a refractive index greater than 1.66.

Each of the at least two lenses disposed in succession may have an Abbe number less than 30. For example, each of the second lens and the third lens may have an Abbe number less than 30.

In addition, the first to third lenses may be formed of materials having different optical characteristics. For example, the first lens may be a material having a relatively large Abbe number, and each of the second and third lenses may be formed of a material having a smaller Abbe number than that of the first lens. Therefore, chromatic aberration correction capability may be improved. A difference in Abbe numbers between the first lens and the second lens may be greater than 29. A difference in Abbe numbers between the second lens and the third lens may be less than 7.

In an embodiment, all of the first to fifth lenses may be formed of a plastic material.

In an embodiment, any one of the first to fifth lenses may be formed of a glass material, and the other lenses may be formed of a plastic material. For example, the first lens may be formed of a glass material, and the second to fifth lenses may be formed of a plastic material. In this case, the first lens has an Abbe number greater than 80.

In an embodiment, two of the first to fifth lenses may be formed of a glass material, and the remaining lenses may be formed of a plastic material. For example, the first lens and the second lens may be formed of a glass material, and the third to fifth lenses may be formed of a plastic material. In this case, the first lens may have an Abbe number greater than 80, and the second lens may have an Abbe number less than 30.

An optical imaging system according to an embodiment of the present disclosure may have characteristics of a telephoto lens having a relatively narrow field of view and a long focal length.

In addition, the optical imaging system according to an embodiment of the present disclosure may be configured so that a diagonal length of the imaging plane is relatively large. For example, an effective capturing region of an image sensor may be wide (i.e., a high-pixel image sensor).

Accordingly, when a captured image is cropped, images according to various magnifications may be captured without deterioration in image quality.

An optical imaging system according to a first embodiment of the present disclosure will be described with reference to FIGS. 1 and 2.

The optical imaging system according to the first embodiment of the present disclosure may include an optical system including a first lens 110, a second lens 120, a third lens 130, a fourth lens 140, and a fifth lens 150, and may further include a filter 160 and an image sensor.

The optical imaging system according to the first embodiment of the present disclosure may form a focus on an imaging plane 170. The imaging plane 170 may refer to a surface on which a focus is formed by an optical imaging system. For example, the imaging plane 170 may refer to one surface of an image sensor through which light is received.

The optical imaging system may further include a reflective member P disposed between the fifth lens 150 and the imaging plane 170, and having a plurality of reflective surfaces for changing an optical path. For example, the reflective member P includes a first reflective surface P1 and a second reflective surface P2. The reflective member P may be a prism, but may also be provided as a mirror.

Lens characteristics of each lens (radius of curvature, thickness of lens or distance between lenses, refractive index, Abbe number, and focal length) are illustrated in Table 1.

TABLE 1

| Surface No. | Reference | Radius of curvature | Thickness or distance | Refractive index | Abbe number | Focal length |
|---|---|---|---|---|---|---|
| S1 | First lens | 3.930 | 1.003 | 1.537 | 55.7 | 8.9164 |
| S2 | | 20.040 | 0.332 | | | |
| S3 | Second lens | 40.865 | 0.269 | 1.619 | 26.0 | −16.8729 |
| S4 | | 8.300 | 0.258 | | | |
| S5 | Third lens | 9.699 | 0.300 | 1.678 | 19.2 | 16.2912 |
| S6 | | 78.969 | 0.100 | | | |
| S7 | Fourth lens | 8.867 | 0.358 | 1.537 | 55.7 | 17.4649 |
| S8 | | 162.616 | 0.090 | | | |
| S9 | Fifth lens | 57.552 | 0.300 | 1.619 | 26.0 | −6.9516 |
| S10 | | 3.997 | 0.800 | | | |
| S11 | Reflective | Infinity | 2.500 | 1.518 | 64.2 | |
| S12 | member | Infinity | 11.500 | 1.518 | 64.2 | |
| S13 | | Infinity | 3.000 | 1.518 | 64.2 | |
| S14 | | Infinity | 0.300 | | | |
| S15 | Filter | Infinity | 0.210 | 1.518 | 64.2 | |
| S16 | | Infinity | 0.501 | | | |
| S17 | Imaging plane | Infinity | | | | |

According to the first embodiment of the present disclosure, a total focal length f is 17.9357 mm, a combined focal length f23 of the first lens 110 and the second lens 120 is 355.675 mm, a field of view (FOV) is 18.93°, and an Fno is 4.5.

In the first embodiment of the present disclosure, the first lens 110 has positive refractive power, a first surface of the first lens 110 is convex, and a second surface of the first lens 110 is concave. The second lens 120 has negative refractive power, a first surface of the second lens 120 is convex, and a second surface of the second lens 120 is concave. The third lens 130 has positive refractive power, a first surface of the third lens 130 is convex, and a second surface of the third lens 130 is concave. The fourth lens 140 has positive refractive power, a first surface of the fourth lens 140 is convex, and a second surface of the fourth lens 140 is concave. The fifth lens 150 has negative refractive power, a first surface of the fifth lens 150 is convex, and a second surface of the fifth lens 150 is concave.

According to the first embodiment of the present disclosure, each surface of the fourth lens 140 and the fifth lens 150 has an aspherical surface coefficient as illustrated in Table 2. For example, the object-side surface of the fourth lens 140 and the image-side surface of the fifth lens 150 are aspherical.

TABLE 2

| | S1 | S2 | S3 | S4 | S5 |
|---|---|---|---|---|---|
| Conic constant(K) | 0.000 | 0.000 | 0.000 | 0.000 | 0.000 |
| $4^{th}$ coefficient(A) | 0.000 | 0.000 | 0.000 | 0.000 | 0.000 |
| $6^{th}$ coefficient(B) | 0.000 | 0.000 | 0.000 | 0.000 | 0.000 |
| $8^{th}$ coefficient(C) | 0.000 | 0.000 | 0.000 | 0.000 | 0.000 |
| $10^{th}$ coefficient(D) | 0.000 | 0.000 | 0.000 | 0.000 | 0.000 |

| | S6 | S7 | S8 | S9 | S10 |
|---|---|---|---|---|---|
| Conic constant(K) | 0.000 | −13.678 | 0.000 | 0.000 | 0.612 |
| $4^{th}$ coefficient(A) | 0.000 | 1.1347E−02 | 0.000 | 0.000 | −3.9868E−03 |
| $6^{th}$ coefficient(B) | 0.000 | 2.4587E−03 | 0.000 | 0.000 | −7.7041E−03 |
| $8^{th}$ coefficient(C) | 0.000 | −1.7393E−03 | 0.000 | 0.000 | 4.9189E−03 |
| $10^{th}$ coefficient(D) | 0.000 | 7.3823E−04 | 0.000 | 0.000 | 2.1425E−03 |

Figure 2:
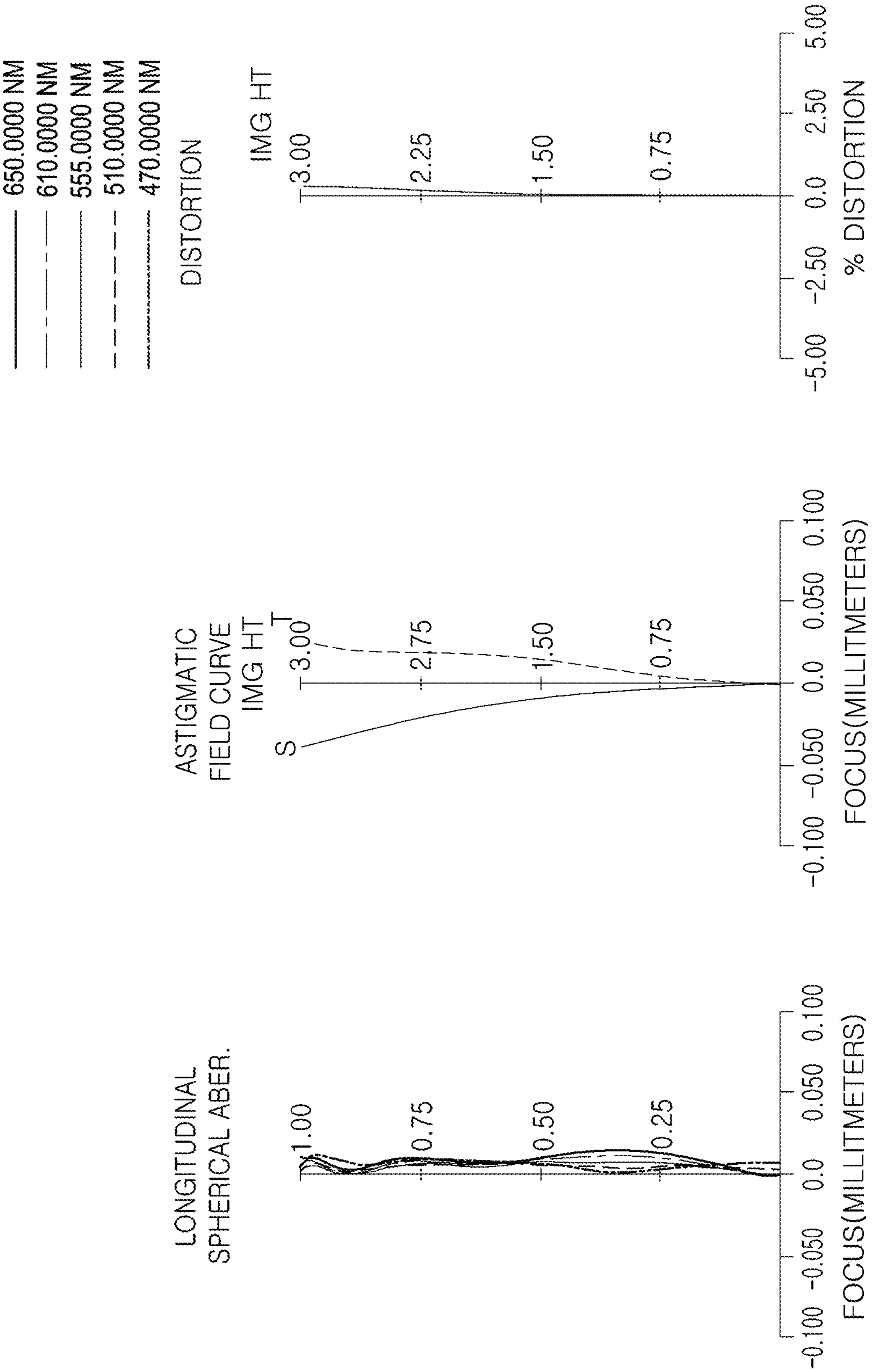
FIG. 2 is a diagram illustrating aberration characteristics of the optical imaging system illustrated in FIG. 1.

In addition, the optical imaging system configured as described above may have aberration characteristics illustrated in FIG. 2.

Figure 3:
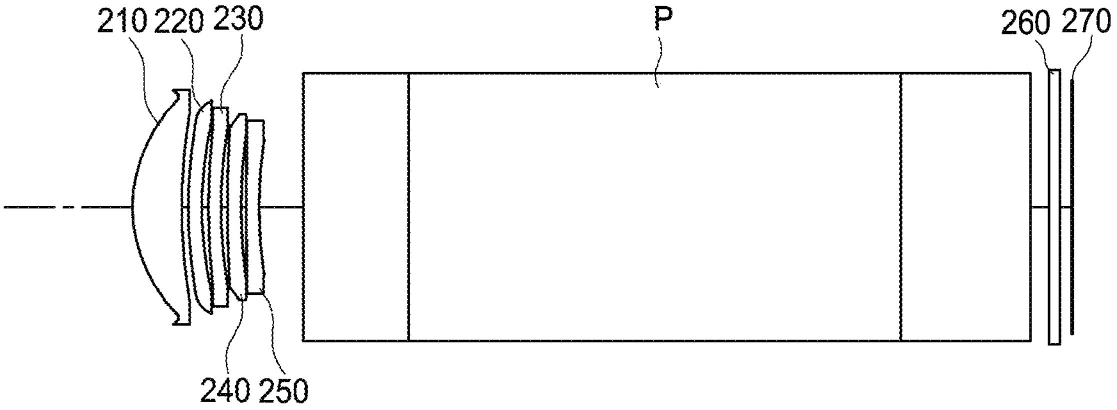
FIG. 3 is a configuration diagram of an optical imaging system according to a second embodiment of the present disclosure.

An optical imaging system according to a second embodiment of the present disclosure will be described with reference to FIGS. 3 and 4.

The optical imaging system according to the second embodiment of the present disclosure may include an optical system including a first lens 210, a second lens 220, a third lens 230, a fourth lens 240, and a fifth lens 250, and may further include a filter 260 and an image sensor.

The optical imaging system according to the second embodiment of the present disclosure may form a focus on an imaging plane 270. The imaging plane 270 may refer to a surface on which a focus is formed by an optical imaging system. For example, the imaging plane 270 may refer to one surface of an image sensor through which light is received.

The optical imaging system may further include a reflective member P disposed between the fifth lens 250 and the imaging plane 270, and having a plurality of reflective surfaces for changing an optical path. For example, the reflective member P includes a first reflective surface P1 and a second reflective surface P2. The reflective member P may be a prism, but may also be provided as a mirror.

Lens characteristics of each lens (radius of curvature, thickness of lens or distance between lenses, refractive index, Abbe number, and focal length) are illustrated in Table 3.

TABLE 3

| Surface No. | Reference | Radius of curvature | Thickness or distance | Refractive index | Abbe number | Focal length |
|---|---|---|---|---|---|---|
| S1 | First lens | 3.686 | 1.172 | 1.537 | 55.7 | 9.3169 |
| S2 | | 12.476 | 0.155 | | | |
| S3 | Second lens | 17.014 | 0.338 | 1.667 | 20.3 | −35.947 |
| S4 | | 9.872 | 0.128 | | | |
| S5 | Third lens | 21.838 | 0.321 | 1.619 | 26.0 | 168.634 |
| S6 | | 27.457 | 0.120 | | | |
| S7 | Fourth lens | 18.128 | 0.320 | 1.537 | 55.7 | −118.346 |
| S8 | | 14.015 | 0.120 | | | |
| S9 | Fifth lens | 32.554 | 0.320 | 1.619 | 26.0 | −27.564 |
| S10 | | 11.156 | 1.000 | | | |
| S11 | Reflective | Infinity | 2.500 | 1.518 | 64.2 | |
| S12 | member | Infinity | 11.500 | 1.518 | 64.2 | |
| S13 | | Infinity | 3.000 | 1.518 | 64.2 | |
| S14 | | Infinity | 0.700 | | | |
| S15 | Filter | Infinity | 0.210 | 1.518 | 64.2 | |
| S16 | | Infinity | 0.100 | | | |
| S17 | Imaging plane | Infinity | | | | |

According to the second embodiment of the present disclosure, a total focal length f is 17.5745 mm, a combined focal length f23 of the first lens 210 and the second lens 220 is −45.374 mm, a field of view (FOV) is 19.36°, and an Fno is 3.5.

In the second embodiment of the present disclosure, the first lens 210 has positive refractive power, a first surface of the first lens 210 is convex, and a second surface of the first lens 210 is concave. The second lens 220 has negative refractive power, a first surface of the second lens 220 is convex, and a second surface of the second lens 220 is concave. The third lens 230 has positive refractive power, a first surface of the third lens 230 is convex, and a second surface of the third lens 230 is concave. The fourth lens 240 has negative refractive power, a first surface of the fourth lens 240 is convex, and a second surface of the fourth lens 240 is concave. The fifth lens 250 has negative refractive power, a first surface of the fifth lens 250 is convex, and a second surface of the fifth lens 250 is concave.

According to the second embodiment of the present disclosure, each surface of the fourth lens 240 and the fifth lens 250 has an aspherical surface coefficient as illustrated in Table 4. For example, the object-side surface of the fourth lens 240 and the image-side surface of the fifth lens 250 are aspherical.

TABLE 4

| | S1 | S2 | S3 | S4 | S5 |
|---|---|---|---|---|---|
| Conic constant(K) | 0.000 | 0.000 | 0.000 | 0.000 | 0.000 |
| $4^{th}$ coefficient(A) | 0.000 | 0.000 | 0.000 | 0.000 | 0.000 |
| $6^{th}$ coefficient(B) | 0.000 | 0.000 | 0.000 | 0.000 | 0.000 |
| $8^{th}$ coefficient(C) | 0.000 | 0.000 | 0.000 | 0.000 | 0.000 |
| $10^{th}$ coefficient(D) | 0.000 | 0.000 | 0.000 | 0.000 | 0.000 |

| | S6 | S7 | S8 | S9 | S10 |
|---|---|---|---|---|---|
| Conic constant(K) | 0.000 | −1.097 | 0.000 | 0.000 | 7.245 |
| $4^{th}$ coefficient(A) | 0.000 | 3.3029E−02 | 0.000 | 0.000 | −2.4027E−02 |
| $6^{th}$ coefficient(B) | 0.000 | 9.2861E−03 | 0.000 | 0.000 | −7.5562E−03 |
| $8^{th}$ coefficient(C) | 0.000 | 1.0741E−03 | 0.000 | 0.000 | 5.4256E−03 |
| $10^{th}$ coefficient(D) | 0.000 | −1.8004E−05 | 0.000 | 0.000 | 2.6493E−03 |

Figure 4:
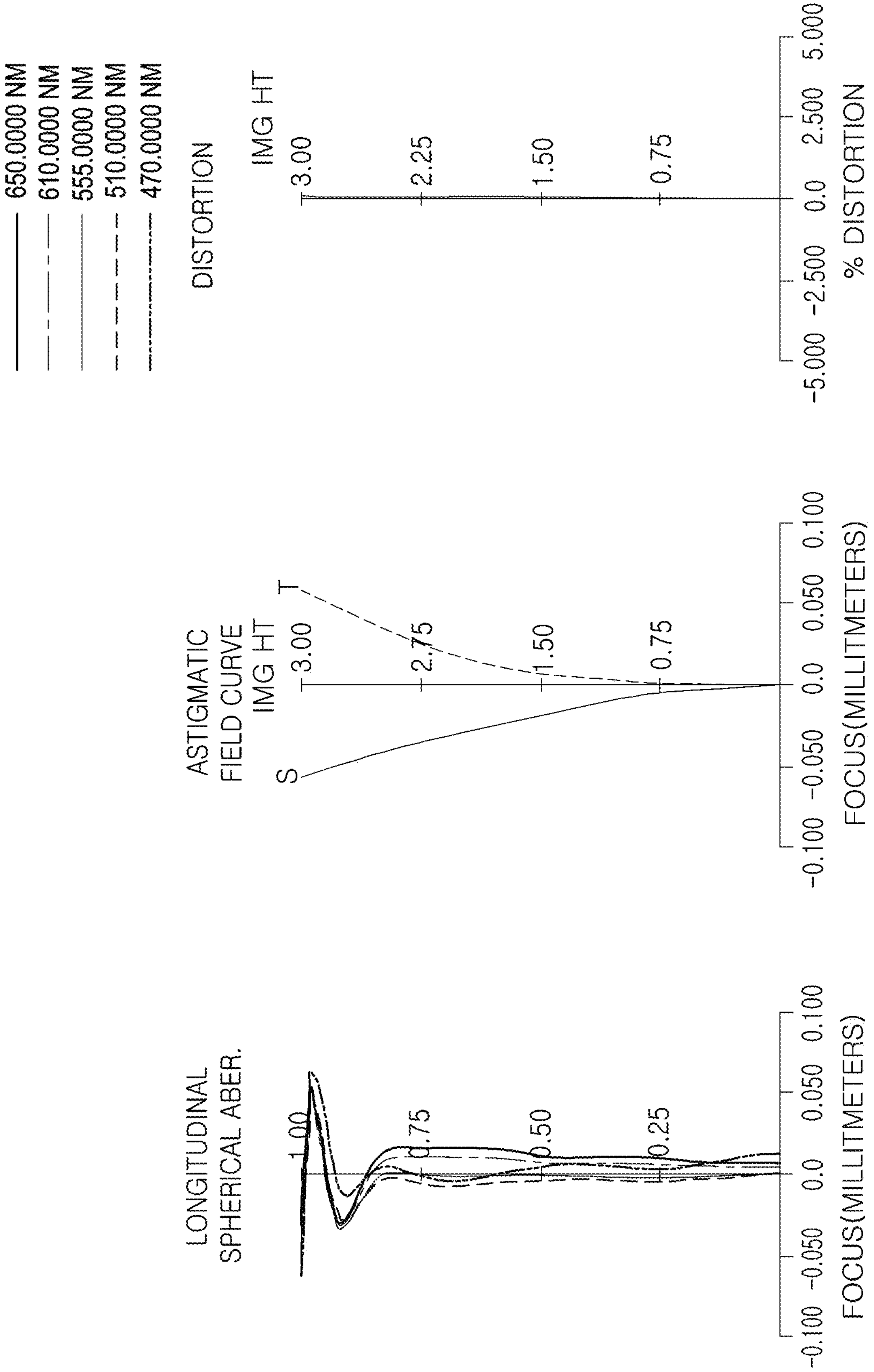
FIG. 4 is a diagram illustrating aberration characteristics of the optical imaging system illustrated in FIG. 3.

In addition, the optical imaging system configured as described above may have aberration characteristics illustrated in FIG. 4.

Figure 5:
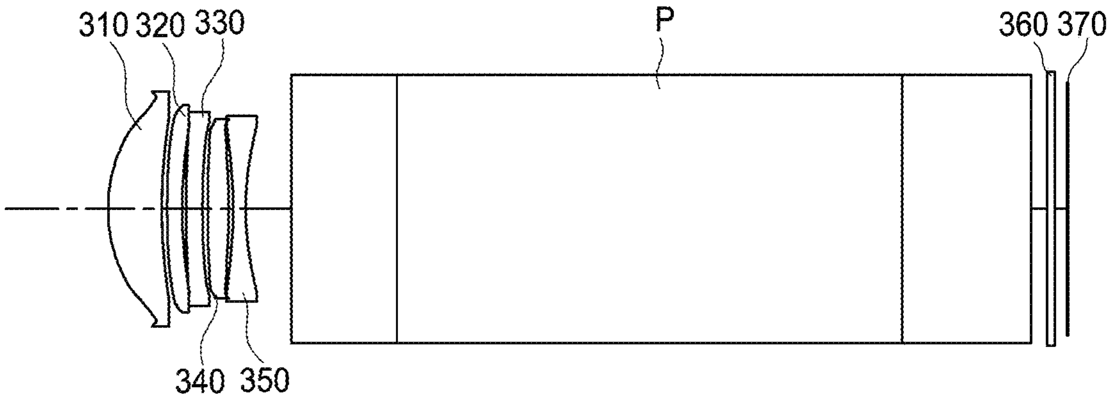
FIG. 5 is a configuration diagram of an optical imaging system according to a third embodiment of the present disclosure.

An optical imaging system according to a third embodiment of the present disclosure will be described with reference to FIGS. 5 and 6.

The optical imaging system according to the third embodiment of the present disclosure may include an optical system including a first lens 310, a second lens 320, a third lens 330, a fourth lens 340, and a fifth lens 350, and may further include a filter 360 and an image sensor.

The optical imaging system according to the third embodiment of the present disclosure may form a focus on an imaging plane 370. The imaging plane 370 may refer to a surface on which a focus is formed by an optical imaging system. For example, the imaging plane 370 may refer to one surface of an image sensor through which light is received.

The optical imaging system may further include a reflective member P disposed between the fifth lens 350 and the imaging plane 370, and having a plurality of reflective surfaces for changing an optical path. For example, the reflective member P includes a first reflective surface P1 and a second reflective surface P2. The reflective member P may be a prism, but may also be provided as a mirror.

Lens characteristics of each lens (radius of curvature, thickness of lens or distance between lenses, refractive index, Abbe number, and focal length) are illustrated in Table 5.

TABLE 5

| Surface No. | Reference | Radius of curvature | Thickness or distance | Refractive index | Abbe number | Focal length |
|---|---|---|---|---|---|---|
| S1 | First lens | 5.514 | 1.846 | 1.537 | 55.7 | 13.5054 |
| S2 | | 20.372 | 0.196 | | | |
| S3 | Second lens | 28.610 | 0.511 | 1.667 | 20.3 | −102.378 |
| S4 | | 20.017 | 0.187 | | | |
| S5 | Third lens | 83.829 | 0.526 | 1.619 | 26.0 | −118.513 |
| S6 | | 39.038 | 0.180 | | | |
| S7 | Fourth lens | 23.641 | 0.679 | 1.537 | 55.7 | 31.9529 |
| S8 | | −61.764 | 0.180 | | | |
| S9 | Fifth lens | −31.393 | 0.420 | 1.570 | 37.3 | −15.3871 |
| S10 | | 12.241 | 1.500 | | | |
| S11 | Reflective | Infinity | 3.750 | 1.518 | 64.2 | |
| S12 | member | Infinity | 17.250 | 1.518 | 64.2 | |
| S13 | | Infinity | 4.500 | 1.518 | 64.2 | |
| S14 | | Infinity | 1.050 | | | |
| S15 | Filter | Infinity | 0.210 | 1.518 | 64.2 | |
| S16 | | Infinity | 0.100 | | | |
| S17 | Imaging plane | Infinity | | | | |

According to the third embodiment of the present disclosure, a total focal length f is 27.0295 mm, a combined focal length f23 of the first lens 310 and the second lens 320 is −54.912 mm, a field of view (FOV) is 18.87°, and an Fno is 3.7.

In the third embodiment of the present disclosure, the first lens 310 has positive refractive power, a first surface of the first lens 310 is convex, and a second surface of the first lens 310 is concave. The second lens 320 has negative refractive power, a first surface of the second lens 320 is convex, and a second surface of the second lens 320 is concave. The third lens 330 has negative refractive power, a first surface of the third lens 330 is convex, and a second surface of the third lens 330 is concave. The fourth lens 340 has positive refractive power, a first surface and a second surface of the fourth lens 340 are convex. The fifth lens 350 has negative refractive power, and a first surface and a second surface of the fifth lens 350 are concave.

According to the third embodiment of the present disclosure, each surface of the fourth lens 340 and the fifth lens 350 has an aspherical surface coefficient as illustrated in Table 6. For example, the object-side surface of the fourth lens 340 and the image-side surface of the fifth lens 350 are aspherical.

TABLE 6

| | S1 | S2 | S3 | S4 | S5 |
|---|---|---|---|---|---|
| Conic constant(K) | 0.000 | 0.000 | 0.000 | 0.000 | 0.000 |
| $4^{th}$ coefficient(A) | 0.000 | 0.000 | 0.000 | 0.000 | 0.000 |
| $6^{th}$ coefficient(B) | 0.000 | 0.000 | 0.000 | 0.000 | 0.000 |
| $8^{th}$ coefficient(C) | 0.000 | 0.000 | 0.000 | 0.000 | 0.000 |
| $10^{th}$ coefficient(D) | 0.000 | 0.000 | 0.000 | 0.000 | 0.000 |

TABLE 6-continued

| | S6 | S7 | S8 | S9 | S10 |
|---|---|---|---|---|---|
| Conic constant(K) | 0.000 | 6.754 | 0.000 | 0.000 | 6.966 |
| $4^{th}$ coefficient(A) | 0.000 | 4.6569E−02 | 0.000 | 0.000 | −3.7082E−02 |
| $6^{th}$ coefficient(B) | 0.000 | 1.5805E−02 | 0.000 | 0.000 | −1.1260E−02 |
| $8^{th}$ coefficient(C) | 0.000 | 1.9874E−03 | 0.000 | 0.000 | 8.0653E−03 |
| $10^{th}$ coefficient(D) | 0.000 | 5.2633E−05 | 0.000 | 0.000 | 4.0137E−03 |

Figure 6:
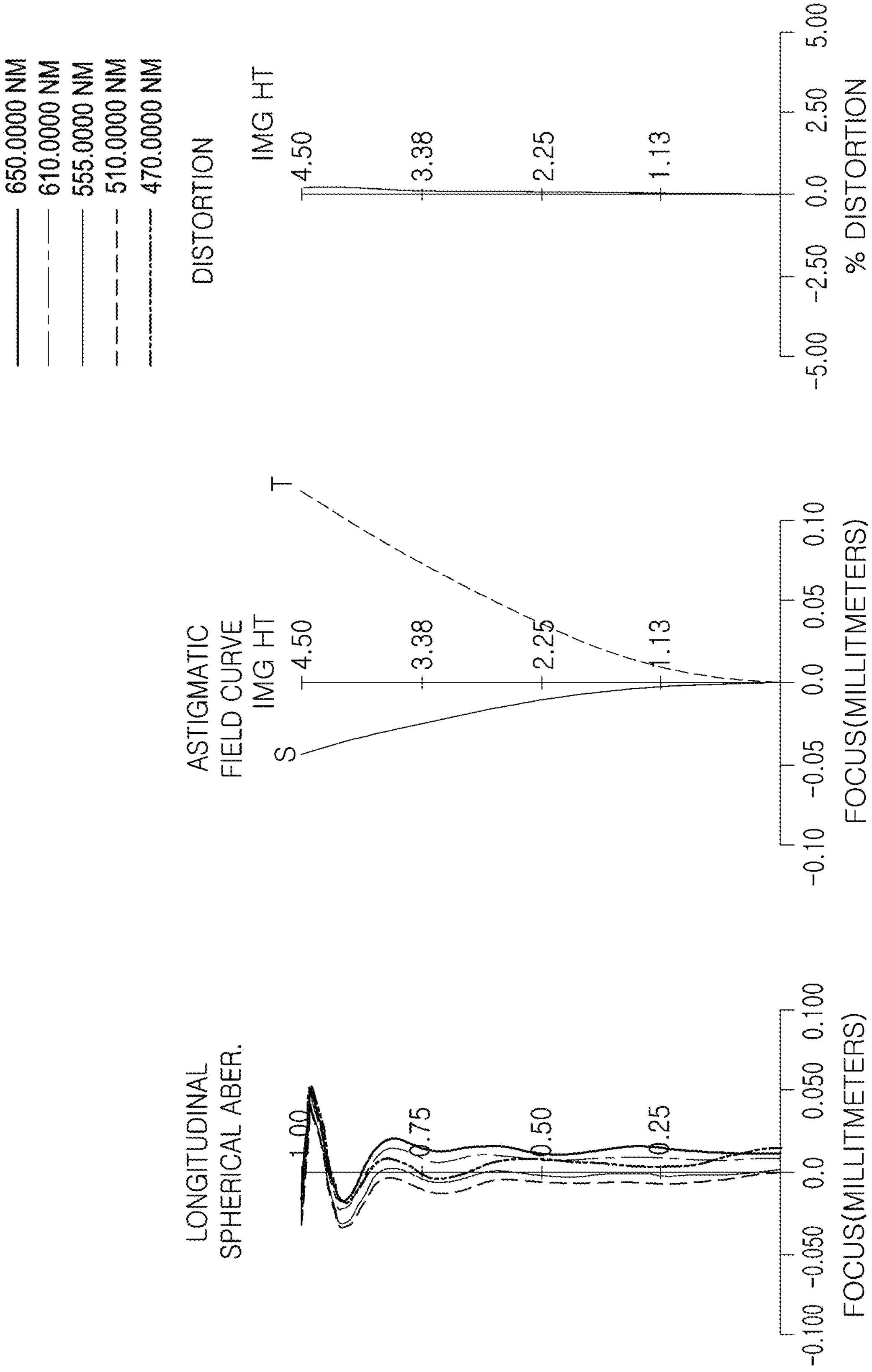
FIG. 6 is a diagram illustrating aberration characteristics of the optical imaging system illustrated in FIG. 5.

In addition, the optical imaging system configured as described above may have aberration characteristics illustrated in FIG. 6.

Figure 7:
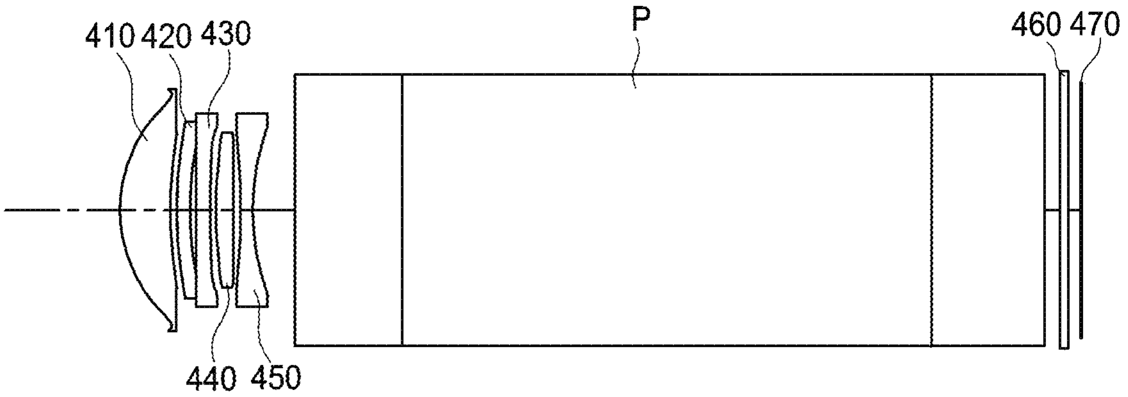
FIG. 7 is a configuration diagram of an optical imaging system according to a fourth embodiment of the present disclosure.

An optical imaging system according to a fourth embodiment of the present disclosure will be described with reference to FIGS. 7 and 8.

The optical imaging system according to the fourth embodiment may include an optical system including a first lens 410, a second lens 420, a third lens 430, a fourth lens 440, and a fifth lens 450, and may further include a filter 460 and an image sensor.

The optical imaging system according to the fourth embodiment of the present disclosure may form a focus on an imaging plane 470. The imaging plane 470 may refer to a surface on which a focus is formed by an optical imaging system. For example, the imaging plane 470 may refer to one surface of an image sensor through which light is received.

The optical imaging system may further include a reflective member P disposed between the fifth lens 450 and the imaging plane 470, and having a plurality of reflective surfaces for changing an optical path. For example, the reflective member P includes a first reflective surface P1 and a second reflective surface P2. The reflective member P may be a prism, but may also be provided as a mirror.

Lens characteristics of each lens (radius of curvature, thickness of lens or distance between lenses, refractive index, Abbe number, and focal length) are illustrated in Table 7.

TABLE 7

| Surface No. | Reference | Radius of curvature | Thickness or distance | Refractive index | Abbe number | Focal length |
|---|---|---|---|---|---|---|
| S1 | First lens | 5.466 | 1.670 | 1.498 | 81.6 | 14.5328 |
| S2 | | 20.051 | 0.180 | | | |
| S3 | Second lens | 15.794 | 0.472 | 1.667 | 20.3 | 3187.65 |
| S4 | | 15.722 | 0.211 | | | |
| S5 | Third lens | −560.724 | 0.467 | 1.619 | 26.0 | −52.2352 |
| S6 | | 34.339 | 0.180 | | | |
| S7 | Fourth lens | 14.501 | 0.609 | 1.537 | 55.7 | 25.0889 |
| S8 | | −184.993 | 0.180 | | | |
| S9 | Fifth lens | −46.810 | 0.420 | 1.537 | 55.7 | −15.6057 |
| S10 | | 10.229 | 1.500 | | | |
| S11 | Reflective | Infinity | 3.750 | 1.518 | 64.2 | |
| S12 | member | Infinity | 17.250 | 1.518 | 64.2 | |
| S13 | | Infinity | 3.750 | 1.518 | 64.2 | |
| S14 | | Infinity | 0.800 | | | |
| S15 | Filter | Infinity | 0.210 | 1.518 | 64.2 | |
| S16 | | Infinity | 0.350 | | | |
| S17 | Imaging plane | Infinity | | | | |

According to the fourth embodiment of the present disclosure, a total focal length f is 25.7516 mm, a combined focal length f23 of the first lens 410 and the second lens 420 is −53.767 mm, a field of view (FOV) is 17.04°, and an Fno is 4.3.

In the fourth embodiment of the present disclosure, the first lens 410 has positive refractive power, a first surface of the first lens 410 is convex, and a second surface of the first lens 410 is concave. The second lens 420 has positive refractive power, a first surface of the second lens 420 is convex, and a second surface of the second lens 420 is concave. The third lens 430 has negative refractive power, a first surface and a second surface of the third lens 430 are concave. The fourth lens 440 has positive refractive power, a first surface and a second surface of the fourth lens 440 are convex. The fifth lens 450 has negative refractive power, and a first surface and a second surface of the fifth lens 450 are concave.

According to the fourth embodiment of the present disclosure, each surface of the fourth lens 440 and the fifth lens 450 has an aspherical surface coefficient as illustrated in Table 8. For example, the object-side surface of the fourth lens 440 and the image-side surface of the fifth lens 450 are aspherical.

TABLE 8

| | S1 | S2 | S3 | S4 | S5 |
|---|---|---|---|---|---|
| Conic constant(K) | 0.000 | 0.000 | 0.000 | 0.000 | 0.000 |
| $4^{th}$ coefficient(A) | 0.000 | 0.000 | 0.000 | 0.000 | 0.000 |
| $6^{th}$ coefficient(B) | 0.000 | 0.000 | 0.000 | 0.000 | 0.000 |
| $8^{th}$ coefficient(C) | 0.000 | 0.000 | 0.000 | 0.000 | 0.000 |
| $10^{th}$ coefficient(D) | 0.000 | 0.000 | 0.000 | 0.000 | 0.000 |

| | S6 | S7 | S8 | S9 | S10 |
|---|---|---|---|---|---|
| Conic constant(K) | 0.000 | 7.001 | 0.000 | 0.000 | 6.169 |
| $4^{th}$ coefficient(A) | 0.000 | 4.4983E−02 | 0.000 | 0.000 | −4.2604E−02 |
| $6^{th}$ coefficient(B) | 0.000 | 1.4691E−02 | 0.000 | 0.000 | −1.0321E−02 |
| $8^{th}$ coefficient(C) | 0.000 | 1.2177E−03 | 0.000 | 0.000 | 7.4719E−03 |
| $10^{th}$ coefficient(D) | 0.000 | −7.2996E−05 | 0.000 | 0.000 | 3.0641E−03 |

Figure 8:
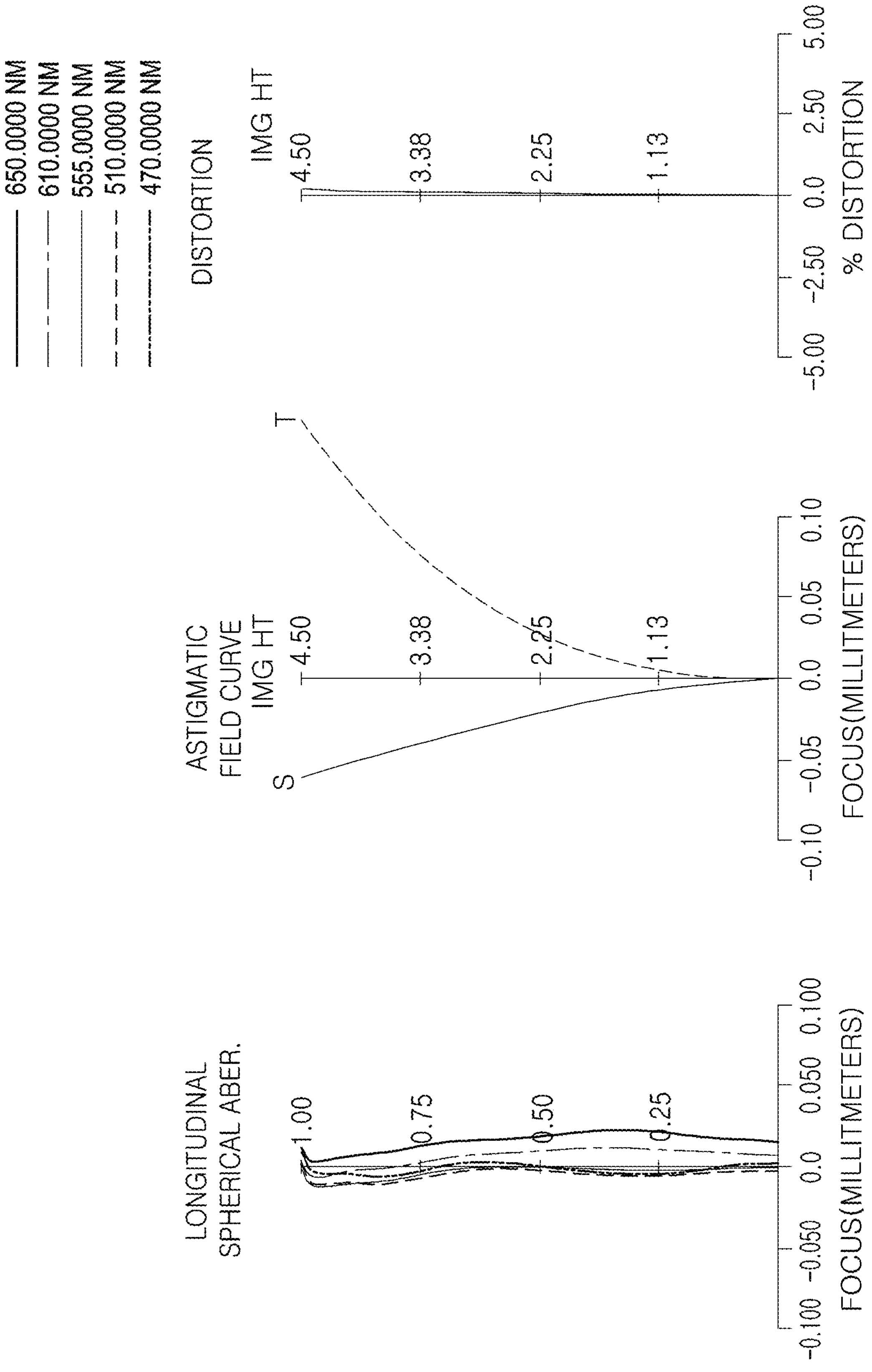
FIG. 8 is a diagram illustrating aberration characteristics of the optical imaging system illustrated in FIG. 7.

In addition, the optical imaging system configured as described above may have aberration characteristics illustrated in FIG. 8.

Figure 9:
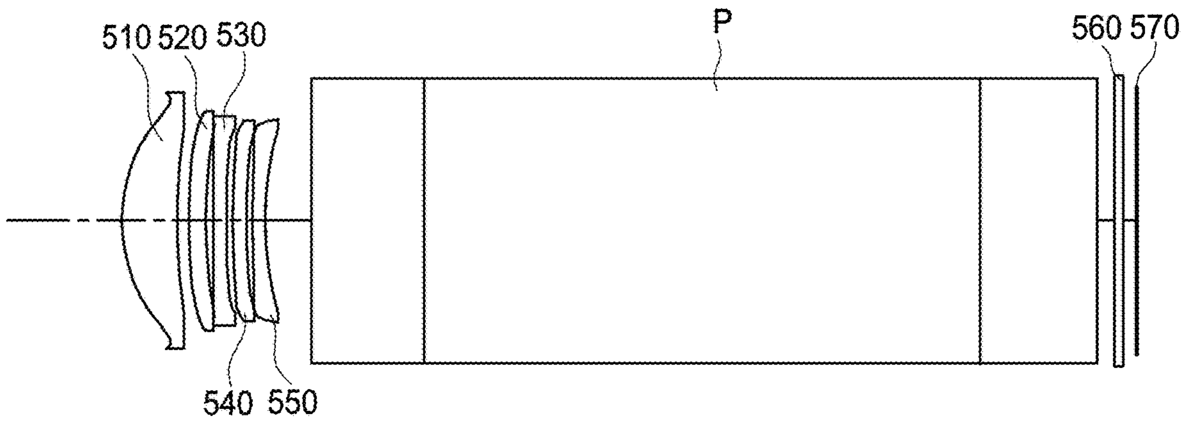
FIG. 9 is a configuration diagram of an optical imaging system according to a fifth embodiment of the present disclosure.

An optical imaging system according to a fifth embodiment of the present disclosure will be described with reference to FIGS. 9 and 10.

The optical imaging system according to the fifth embodiment of the present disclosure may include an optical system including a first lens 510, a second lens 520, a third lens 530, a fourth lens 540, and a fifth lens 550, and may further include a filter 560 and an image sensor.

The optical imaging system according to the fifth embodiment of the present disclosure may form a focus on an imaging plane 570. The imaging plane 570 may refer to a surface on which a focus is formed by an optical imaging system. For example, the imaging plane 570 may refer to one surface of an image sensor through which light is received.

The optical imaging system may further include a reflective member P disposed between the fifth lens 550 and the imaging plane 570, and having a plurality of reflective surfaces for changing an optical path. For example, the reflective member P includes a first reflective surface P1 and a second reflective surface P2. The reflective member P may be a prism, but may also be provided as a mirror.

Lens characteristics of each lens (radius of curvature, thickness of lens or distance between lenses, refractive index, Abbe number, and focal length) are illustrated in Table 9.

TABLE 9

| Surface No. | Reference | Radius of curvature | Thickness or distance | Refractive index | Abbe number | Focal length |
|---|---|---|---|---|---|---|
| S1 | First lens | 5.579 | 1.803 | 1.498 | 81.6 | 14.0042 |
| S2 | | 24.811 | 0.333 | | | |
| S3 | Second lens | 19.088 | 0.509 | 1.669 | 20.3 | 10600.1 |
| S4 | | 18.935 | 0.270 | | | |
| S5 | Third lens | 897.471 | 0.420 | 1.621 | 26.0 | −58.9185 |
| S6 | | 35.127 | 0.180 | | | |
| S7 | Fourth lens | 19.724 | 0.442 | 1.621 | 26.0 | −2159 |
| S8 | | 19.271 | 0.180 | | | |
| S9 | Fifth lens | 31.068 | 0.420 | 1.537 | 55.7 | −36.5762 |
| S10 | | 11.978 | 1.500 | | | |
| S11 | Reflective | Infinity | 3.750 | 1.519 | 64.2 | |
| S12 | member | Infinity | 17.250 | 1.519 | 64.2 | |
| S13 | | Infinity | 3.750 | 1.519 | 64.2 | |
| S14 | | Infinity | 0.800 | | | |
| S15 | Filter | Infinity | 0.210 | 1.519 | 64.2 | |
| S16 | | Infinity | 0.167 | | | |
| S17 | Imaging plane | Infinity | | | | |

According to the fifth embodiment of the present disclosure, a total focal length f is 25.6925 mm, a combined focal length f23 of the first lens 510 and the second lens 520 is −59.894 mm, a field of view (FOV) is 19.84°, and an Fno is 3.6.

In the fifth embodiment of the present disclosure, the first lens 510 has positive refractive power, a first surface of the first lens 510 is convex, and a second surface of the first lens 510 is concave. The second lens 520 has positive refractive power, a first surface of the second lens 520 is convex, and a second surface of the second lens 520 is concave. The third lens 530 has negative refractive power, a first surface of the third lens 530 is convex, and a second surface of the third lens 530 is concave. The fourth lens 540 has negative refractive power, a first surface of the fourth lens 540 is convex, and a second surface of the fourth lens 540 are concave. The fifth lens 550 has negative refractive power, and a first surface of the fifth lens 550 is convex, and a second surface of the fifth lens 550 is concave.

According to the fifth embodiment of the present disclosure, each surface of the fourth lens 540 and the fifth lens 550 has an aspherical surface coefficient as illustrated in Table 10. For example, the object-side surface of the fourth lens 540 and the image-side surface of the fifth lens 550 are aspherical.

TABLE 10

| | S1 | S2 | S3 | S4 | S5 |
|---|---|---|---|---|---|
| Conic constant(K) | 0.000 | 0.000 | 0.000 | 0.000 | 0.000 |
| $4^{th}$ coefficient(A) | 0.000 | 0.000 | 0.000 | 0.000 | 0.000 |
| $6^{th}$ coefficient(B) | 0.000 | 0.000 | 0.000 | 0.000 | 0.000 |
| $8^{th}$ coefficient(C) | 0.000 | 0.000 | 0.000 | 0.000 | 0.000 |
| $10^{th}$ coefficient(D) | 0.000 | 0.000 | 0.000 | 0.000 | 0.000 |

TABLE 10-continued

| | S6 | S7 | S8 | S9 | S10 |
|---|---|---|---|---|---|
| Conic constant(K) | 0.000 | 6.326 | 0.000 | 0.000 | 5.802 |
| $4^{th}$ coefficient(A) | 0.000 | 4.5885E−02 | 0.000 | 0.000 | −4.3638E−02 |
| $6^{th}$ coefficient(B) | 0.000 | 1.2610E−02 | 0.000 | 0.000 | −8.5422E−03 |
| $8^{th}$ coefficient(C) | 0.000 | −4.6826E−04 | 0.000 | 0.000 | 6.5223E−03 |
| $10^{th}$ coefficient(D) | 0.000 | −4.0156E−04 | 0.000 | 0.000 | 2.6836E−03 |

Figure 10:
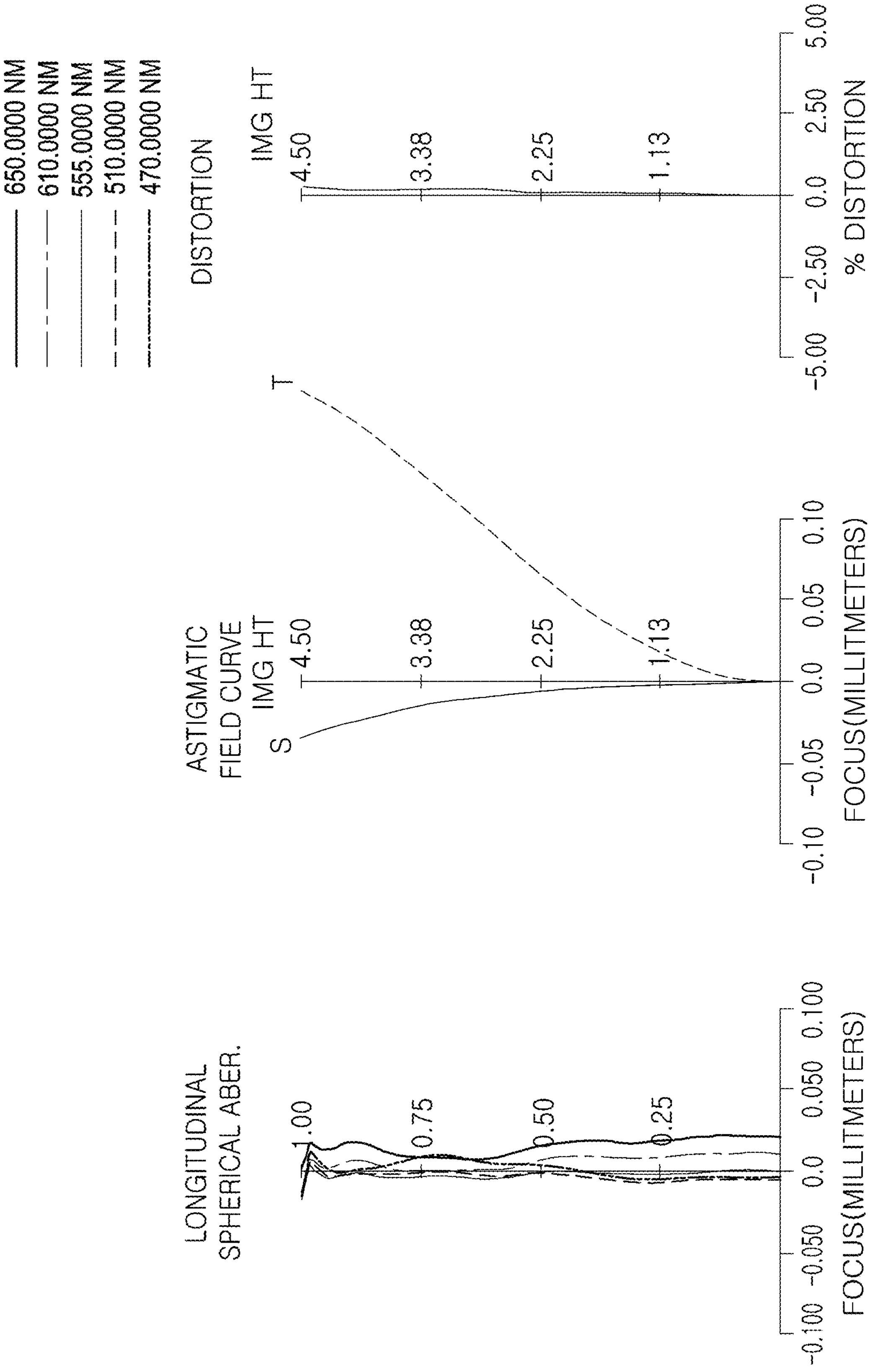
FIG. 10 is a diagram illustrating aberration characteristics of the optical imaging system illustrated in FIG. 9.

In addition, the optical imaging system configured as described above may have aberration characteristics illustrated in FIG. 10.

Figure 11:
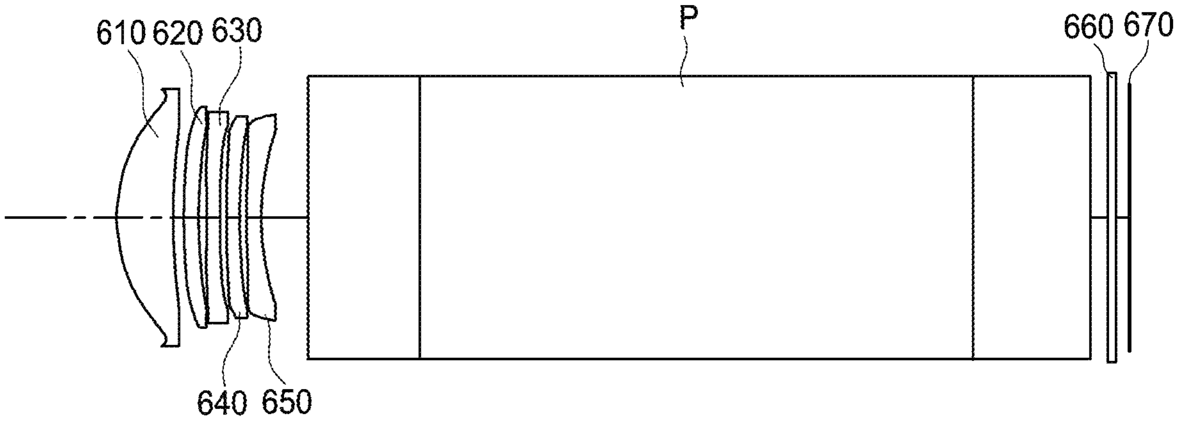
FIG. 11 is a configuration diagram of an optical imaging system according to a sixth embodiment of the present disclosure.

An optical imaging system according to a sixth embodiment of the present disclosure will be described with reference to FIGS. 11 and 12.

The optical imaging system according to the sixth embodiment of the present disclosure may include an optical system including a first lens 610, a second lens 620, a third lens 630, a fourth lens 640, and a fifth lens 650, and may further include a filter 660 and an image sensor.

The optical imaging system according to the sixth embodiment of the present disclosure may form a focus on an imaging plane 670. The imaging plane 670 may refer to a surface on which a focus is formed by an optical imaging system. For example, the imaging plane 670 may refer to one surface of an image sensor through which light is received.

The optical imaging system may further include a reflective member P disposed between the fifth lens 650 and the imaging plane 670, and having a plurality of reflective surfaces for changing an optical path. For example, the reflective member P includes a first reflective surface P1 and a second reflective surface P2. The reflective member P may be a prism, but may also be provided as a mirror.

Lens characteristics of each lens (radius of curvature, thickness of lens or distance between lenses, refractive index, Abbe number, and focal length) are illustrated in Table 11.

TABLE 11

| Surface No. | Reference | Radius of curvature | Thickness or distance | Refractive index | Abbe number | Focal length |
|---|---|---|---|---|---|---|
| S1 | First lens | 5.585 | 1.799 | 1.498 | 81.6 | 14.0323 |
| S2 | | 24.751 | 0.351 | | | |
| S3 | Second lens | 18.266 | 0.445 | 1.669 | 20.3 | −1306.62 |
| S4 | | 17.717 | 0.277 | | | |
| S5 | Third lens | 330.473 | 0.420 | 1.621 | 26.0 | −62.7608 |
| S6 | | 34.826 | 0.180 | | | |
| S7 | Fourth lens | 19.286 | 0.446 | 1.621 | 26.0 | −32472.8 |
| S8 | | 19.097 | 0.180 | | | |
| S9 | Fifth lens | 30.815 | 0.491 | 1.537 | 55.7 | −36.056 |
| S10 | | 11.826 | 1.500 | | | |
| S11 | Reflective | Infinity | 3.750 | 1.519 | 64.2 | |
| S12 | member | Infinity | 17.250 | 1.519 | 64.2 | |
| S13 | | Infinity | 3.750 | 1.519 | 64.2 | |
| S14 | | Infinity | 0.500 | | | |
| S15 | Filter | Infinity | 0.210 | 1.519 | 64.2 | |
| S16 | | Infinity | 0.433 | | | |
| S17 | Imaging plane | Infinity | | | | |

According to the sixth embodiment of the present disclosure, a total focal length f is 25.6924 mm, a combined focal length f23 of the first lens 610 and the second lens 620 is −60.422 mm, a field of view (FOV) is 19.84°, and an Fno is 3.6.

In the sixth embodiment of the present disclosure, the first lens 610 has positive refractive power, a first surface of the first lens 610 is convex, and a second surface of the first lens 610 is concave. The second lens 620 has negative refractive power, a first surface of the second lens 620 is convex, and a second surface of the second lens 620 is concave. The third lens 630 has negative refractive power, a first surface of the third lens 630 is convex, and a second surface of the third lens 630 is concave. The fourth lens 640 has negative refractive power, a first surface of the fourth lens 640 is convex, and a second surface of the fourth lens 640 is concave. The fifth lens 650 has negative refractive power, and a first surface of the fifth lens 650 is convex, and a second surface of the fifth lens 650 is concave.

According to the sixth embodiment of the present disclosure, each surface of the fourth lens 640 and the fifth lens 650 has an aspherical surface coefficient as illustrated in Table 12. For example, the object-side surface of the fourth lens 640 and the image-side surface of the fifth lens 650 are aspherical.

TABLE 12

| | S1 | S2 | S3 | S4 | S5 |
|---|---|---|---|---|---|
| Conic constant(K) | 0.000 | 0.000 | 0.000 | 0.000 | 0.000 |
| $4^{th}$ coefficient(A) | 0.000 | 0.000 | 0.000 | 0.000 | 0.000 |
| $6^{th}$ coefficient(B) | 0.000 | 0.000 | 0.000 | 0.000 | 0.000 |
| $8^{th}$ coefficient(C) | 0.000 | 0.000 | 0.000 | 0.000 | 0.000 |
| $10^{th}$ coefficient(D) | 0.000 | 0.000 | 0.000 | 0.000 | 0.000 |

TABLE 12-continued

| | S6 | S7 | S8 | S9 | S10 |
|---|---|---|---|---|---|
| Conic constant(K) | 0.000 | 6.390 | 0.000 | 0.000 | 5.724 |
| $4^{th}$ coefficient(A) | 0.000 | 4.6140E−02 | 0.000 | 0.000 | −4.3353E−02 |
| $6^{th}$ coefficient(B) | 0.000 | 1.2653E−02 | 0.000 | 0.000 | −8.2880E−03 |
| $8^{th}$ coefficient(C) | 0.000 | −5.2151E−04 | 0.000 | 0.000 | 6.4432E−03 |
| $10^{th}$ coefficient(D) | 0.000 | −4.4183E−04 | 0.000 | 0.000 | 2.6185E−03 |

Figure 12:
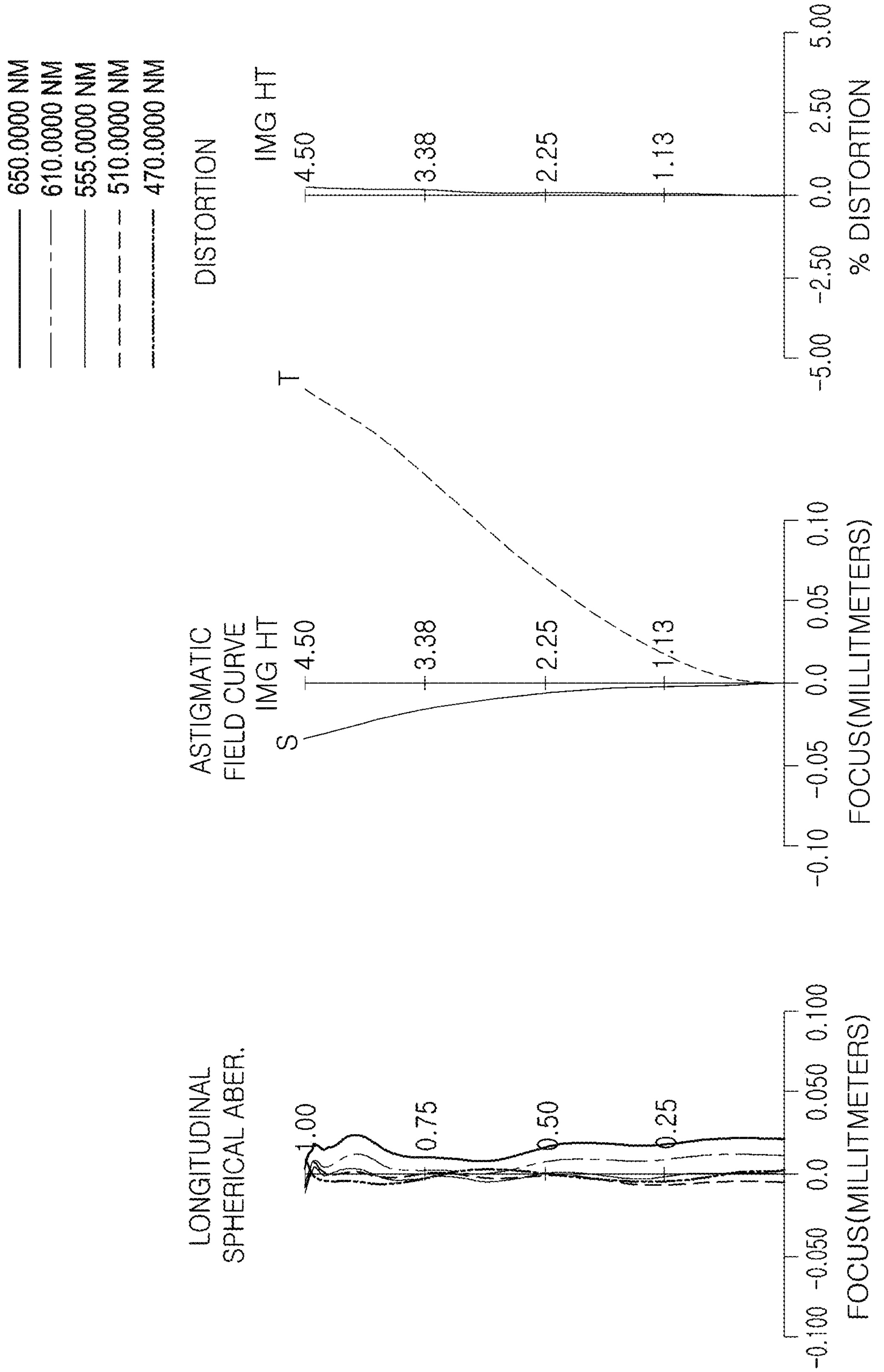
FIG. 12 is a diagram illustrating aberration characteristics of the optical imaging system illustrated in FIG. 11.

In addition, the optical imaging system configured as described above may have aberration characteristics illustrated in FIG. 12.

Figure 13:
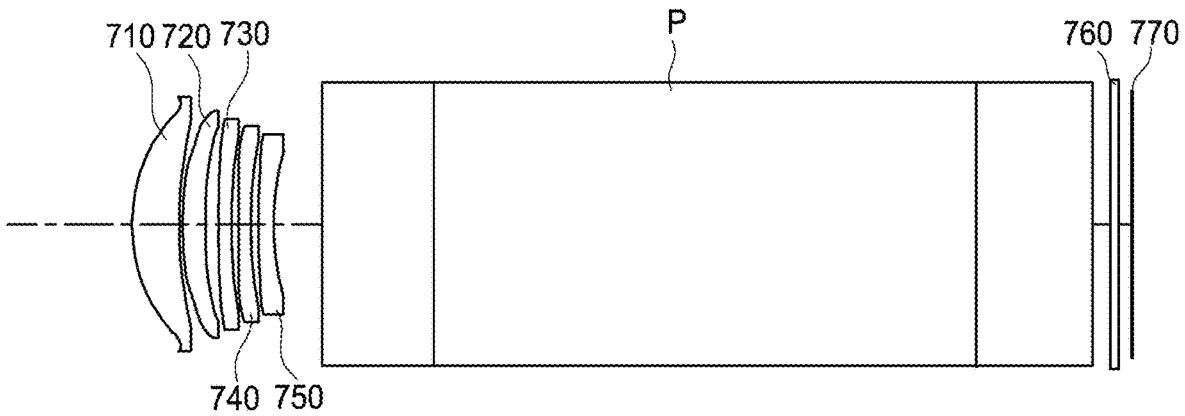
FIG. 13 is a configuration diagram of an optical imaging system according to a seventh embodiment of the present disclosure.

An optical imaging system according to a seventh embodiment of the present disclosure will be described with reference to FIGS. 13 and 14.

The optical imaging system according to the seventh embodiment of the present disclosure may include an optical system including a first lens 710, a second lens 720, a third lens 730, a fourth lens 740, and a fifth lens 750, and may further include a filter 760 and an image sensor.

The optical imaging system according to the seventh embodiment of the present disclosure may form a focus on an imaging plane 770. The imaging plane 770 may refer to a surface on which a focus is formed by an optical imaging system. For example, the imaging plane 770 may refer to one surface of an image sensor through which light is received.

The optical imaging system may further include a reflective member P disposed between the fifth lens 750 and the imaging plane 770, and having a plurality of reflective surfaces for changing an optical path. For example, the reflective member P includes a first reflective surface P1 and a second reflective surface P2. The reflective member P may be a prism, but it may also be provided as a mirror.

Lens characteristics of each lens (radius of curvature, thickness of lens or distance between lenses, refractive index, Abbe number, and focal length) are illustrated in Table 13.

TABLE 13

| Surface No. | Reference | Radius of curvature | Thickness or distance | Refractive index | Abbe number | Focal length |
|---|---|---|---|---|---|---|
| S1 | First lens | 5.709 | 1.537 | 1.498 | 81.6 | 17.7575 |
| S2 | | 14.640 | 0.100 | | | |
| S3 | Second lens | 9.649 | 0.690 | 1.723 | 29.5 | 49.0732 |
| S4 | | 12.856 | 0.445 | | | |
| S5 | Third lens | 43.942 | 0.446 | 1.621 | 26.0 | −170.066 |
| S6 | | 30.904 | 0.180 | | | |
| S7 | Fourth lens | 21.488 | 0.441 | 1.537 | 55.7 | 413.944 |
| S8 | | 23.616 | 0.180 | | | |
| S9 | Fifth lens | 40.090 | 0.440 | 1.621 | 26.0 | −19.9197 |
| S10 | | 9.409 | 1.500 | | | |
| S11 | Reflective | Infinity | 3.750 | 1.519 | 64.2 | |
| S12 | member | Infinity | 17.250 | 1.519 | 64.2 | |
| S13 | | Infinity | 3.750 | 1.519 | 64.2 | |
| S14 | | Infinity | 0.500 | | | |
| S15 | Filter | Infinity | 0.000 | 1.519 | 64.2 | |
| S16 | | Infinity | 0.738 | | | |
| S17 | Imaging plane | Infinity | | | | |

According to the seventh embodiment of the present disclosure, a total focal length f is 26.3794 mm, a combined focal length f23 of the first lens 710 and the second lens 720 is 67.384 mm, a field of view (FOV) is 19.31°, and an Fno is 3.7.

In the seventh embodiment of the present disclosure, the first lens 710 has positive refractive power, a first surface of the first lens 710 is convex, and a second surface of the first lens 710 is concave. The second lens 720 has positive refractive power, a first surface of the second lens 720 is convex, and a second surface of the second lens 720 is concave. The third lens 730 has negative refractive power, a first surface of the third lens 730 is convex, and a second surface of the third lens 730 is concave. The fourth lens 740 has positive refractive power, a first surface of the fourth lens 740 is convex, and a second surface of the fourth lens 740 is concave. The fifth lens 750 has negative refractive power, and a first surface of the fifth lens 750 is convex, and a second surface of the fifth lens 750 is concave.

According to the seventh embodiment of the present disclosure, each surface of the fourth lens 740 and the fifth lens 750 has an aspherical surface coefficient as illustrated in Table 14. For example, the object-side surface of the fourth lens 740 and the image-side surface of the fifth lens 750 are aspherical.

TABLE 14

| | S1 | S2 | S3 | S4 | S5 |
|---|---|---|---|---|---|
| Conic constant(K) | 0.000 | 0.000 | 0.000 | 0.000 | 0.000 |
| $4^{th}$ coefficient(A) | 0.000 | 0.000 | 0.000 | 0.000 | 0.000 |
| $6^{th}$ coefficient(B) | 0.000 | 0.000 | 0.000 | 0.000 | 0.000 |
| $8^{th}$ coefficient(C) | 0.000 | 0.000 | 0.000 | 0.000 | 0.000 |
| $10^{th}$ coefficient(D) | 0.000 | 0.000 | 0.000 | 0.000 | 0.000 |

TABLE 14-continued

| | S6 | S7 | S8 | S9 | S10 |
|---|---|---|---|---|---|
| Conic constant(K) | 0.000 | −6.343 | 0.000 | 0.000 | 4.660 |
| $4^{th}$ coefficient(A) | 0.000 | 5.3589E−02 | 0.000 | 0.000 | −1.9858E−02 |
| $6^{th}$ coefficient(B) | 0.000 | 1.8425E−02 | 0.000 | 0.000 | −1.3145E−02 |
| $8^{th}$ coefficient(C) | 0.000 | 1.8890E−03 | 0.000 | 0.000 | 7.5008E−03 |
| $10^{th}$ coefficient(D) | 0.000 | −5.6871E−05 | 0.000 | 0.000 | 3.8089E−03 |

Figure 14:
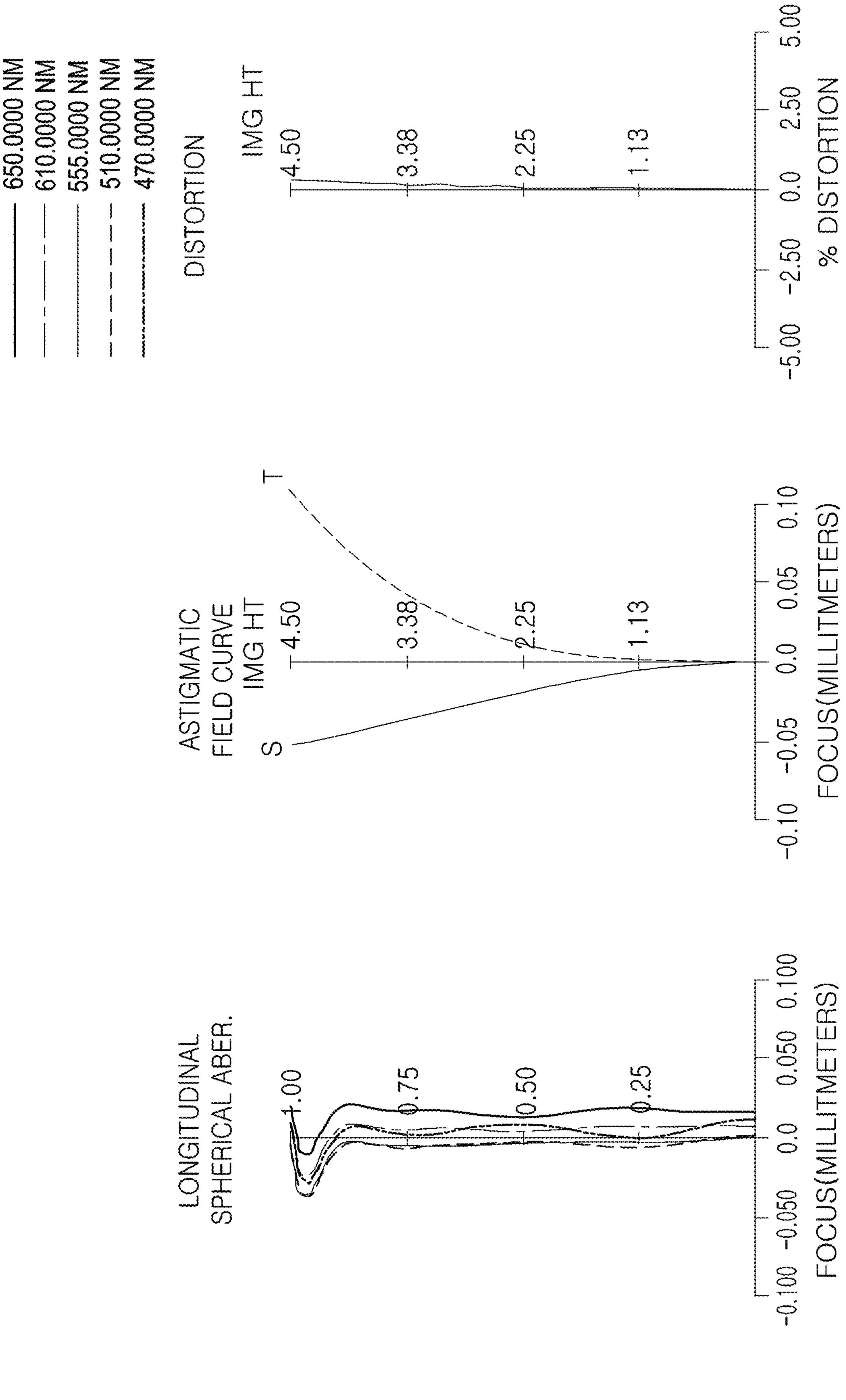
FIG. 14 is a diagram illustrating aberration characteristics of the optical imaging system illustrated in FIG. 12.

In addition, the optical imaging system configured as described above may have aberration characteristics illustrated in FIG. 14.

Figure 15:
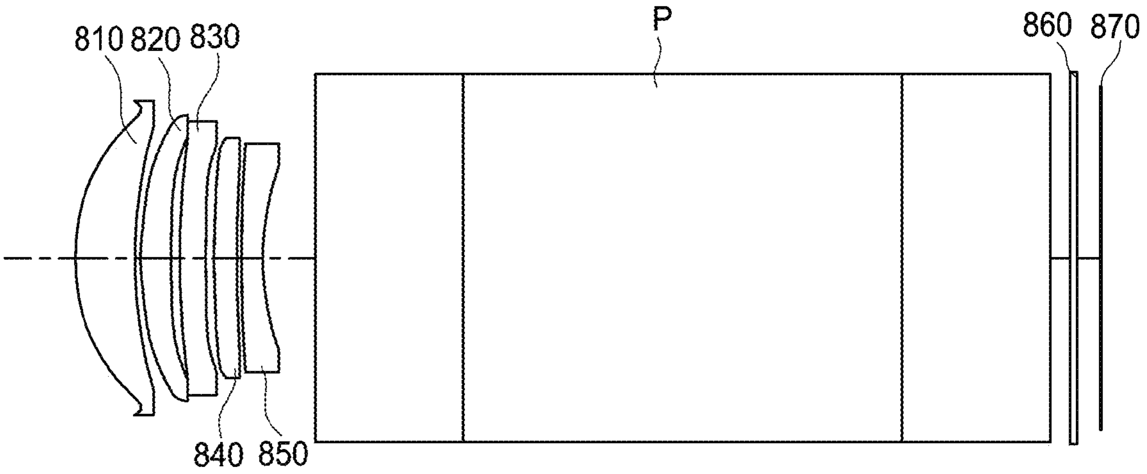
FIG. 15 is a configuration diagram of an optical imaging system according to an eighth embodiment of the present disclosure.

An optical imaging system according to an eighth embodiment of the present disclosure will be described with reference to FIGS. 15 and 16.

The optical imaging system according to the eighth embodiment of the present disclosure may include an optical system including a first lens 810, a second lens 820, a third lens 830, a fourth lens 840, and a fifth lens 850, and may further include a filter 860 and an image sensor.

The optical imaging system according to the eighth embodiment of the present disclosure may form a focus on an imaging plane 870. The imaging plane 870 may refer to a surface on which a focus is formed by an optical imaging system. For example, the imaging plane 870 may refer to one surface of an image sensor through which light is received.

The optical imaging system may further include a reflective member P disposed between the fifth lens 850 and the imaging plane 870, and having a plurality of reflective surfaces for changing an optical path. For example, the reflective member P includes a first reflective surface P1 and a second reflective surface P2. The reflective member P may be a prism, but it may also be provided as a mirror.

Lens characteristics of each lens (radius of curvature, thickness of lens or distance between lenses, refractive index, Abbe number, and focal length) are illustrated in Table 15.

TABLE 15

| Surface No. | Reference | Radius of curvature | Thickness or distance | Refractive index | Abbe number | Focal length |
|---|---|---|---|---|---|---|
| S1 | First lens | 5.488 | 1.570 | 1.498 | 81.6 | 16.8224 |
| S2 | | 14.394 | 0.100 | | | |
| S3 | Second lens | 8.741 | 0.755 | 1.722 | 29.5 | 35.0739 |
| S4 | | 12.869 | 0.260 | | | |
| S5 | Third lens | 45.264 | 0.657 | 1.619 | 26.0 | −70.5696 |
| S6 | | 22.111 | 0.180 | | | |
| S7 | Fourth lens | 14.461 | 0.540 | 1.537 | 55.7 | 57.5311 |
| S8 | | 26.852 | 0.180 | | | |
| S9 | Fifth lens | 51.513 | 0.500 | 1.619 | 26.0 | −15.2207 |
| S10 | | 7.938 | 1.500 | | | |
| S11 | Reflective | Infinity | 3.750 | 1.518 | 64.2 | |
| S12 | member | Infinity | 11.250 | 1.518 | 64.2 | |
| S13 | | Infinity | 3.750 | 1.518 | 64.2 | |
| S14 | | Infinity | 0.500 | | | |
| S15 | Filter | Infinity | 0.000 | 1.518 | 64.2 | |
| S16 | | Infinity | 0.738 | | | |
| S17 | Imaging plane | Infinity | | | | |

According to the eighth embodiment of the present disclosure, a total focal length f is 22.1449 mm, a combined focal length f23 of the first lens 810 and the second lens 820 is 65.433 mm, a field of view (FOV) is 22.80°, and an Fno is 3.

In the eighth embodiment of the present disclosure, the first lens 810 has positive refractive power, a first surface of the first lens 810 is convex, and a second surface of the first lens 810 is concave. The second lens 820 has positive refractive power, a first surface of the second lens 820 is convex, and a second surface of the second lens 820 is concave. The third lens 830 has negative refractive power, a first surface of the third lens 830 is convex, and a second surface of the third lens 830 is concave. The fourth lens 840 has positive refractive power, a first surface of the fourth lens 840 is convex, and a second surface of the fourth lens 840 is concave. The fifth lens 850 has negative refractive power, and a first surface of the fifth lens 850 is convex, and a second surface of the fifth lens 850 is concave.

According to the eighth embodiment of the present disclosure, each surface of the fourth lens 840 and the fifth lens 850 has an aspherical surface coefficient as illustrated in Table 16. For example, the object-side surface of the fourth lens 840 and the image-side surface of the fifth lens 850 are aspherical.

TABLE 16

| | S1 | S2 | S3 | S4 | S5 |
|---|---|---|---|---|---|
| Conic constant(K) | 0.000 | 0.000 | 0.000 | 0.000 | 0.000 |
| $4^{th}$ coefficient(A) | 0.000 | 0.000 | 0.000 | 0.000 | 0.000 |
| $6^{th}$ coefficient(B) | 0.000 | 0.000 | 0.000 | 0.000 | 0.000 |
| $8^{th}$ coefficient(C) | 0.000 | 0.000 | 0.000 | 0.000 | 0.000 |
| $10^{th}$ coefficient(D) | 0.000 | 0.000 | 0.000 | 0.000 | 0.000 |

TABLE 16-continued

| | S6 | S7 | S8 | S9 | S10 |
|---|---|---|---|---|---|
| Conic constant(K) | 0.000 | −7.101 | 0.000 | 0.000 | 3.470 |
| $4^{th}$ coefficient(A) | 0.000 | 5.2727E−02 | 0.000 | 0.000 | −2.3865E−02 |
| $6^{th}$ coefficient(B) | 0.000 | 1.9801E−02 | 0.000 | 0.000 | −1.3209E−02 |
| $8^{th}$ coefficient(C) | 0.000 | 8.9334E−04 | 0.000 | 0.000 | 7.0935E−03 |
| $10^{th}$ coefficient(D) | 0.000 | −1.8426E−04 | 0.000 | 0.000 | 2.3433E−03 |

Figure 16:
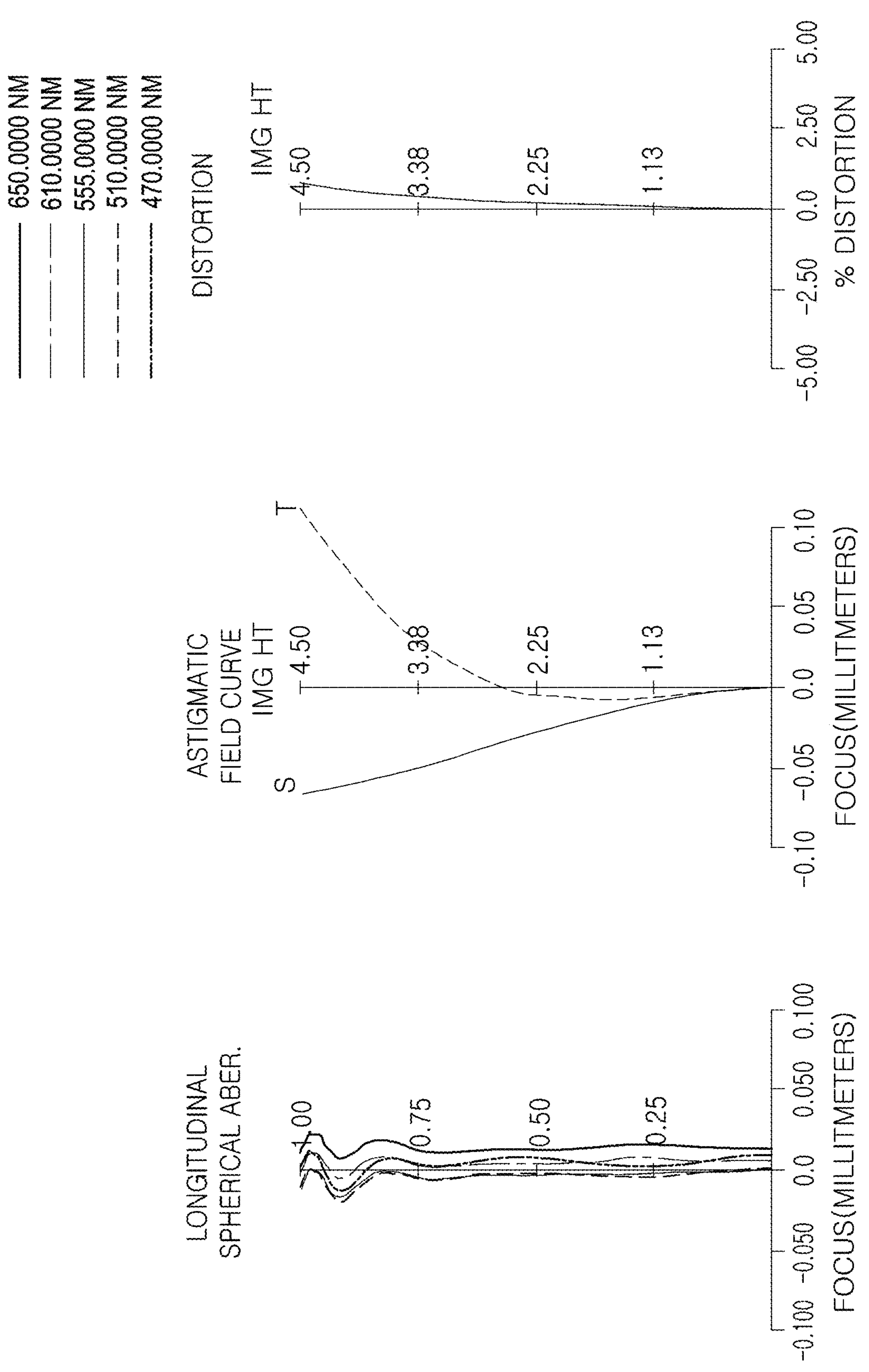
FIG. 16 is a diagram illustrating aberration characteristics of the optical imaging system illustrated in FIG. 15.

In addition, the optical imaging system configured as described above may have aberration characteristics illustrated in FIG. 16.

Figure 17:
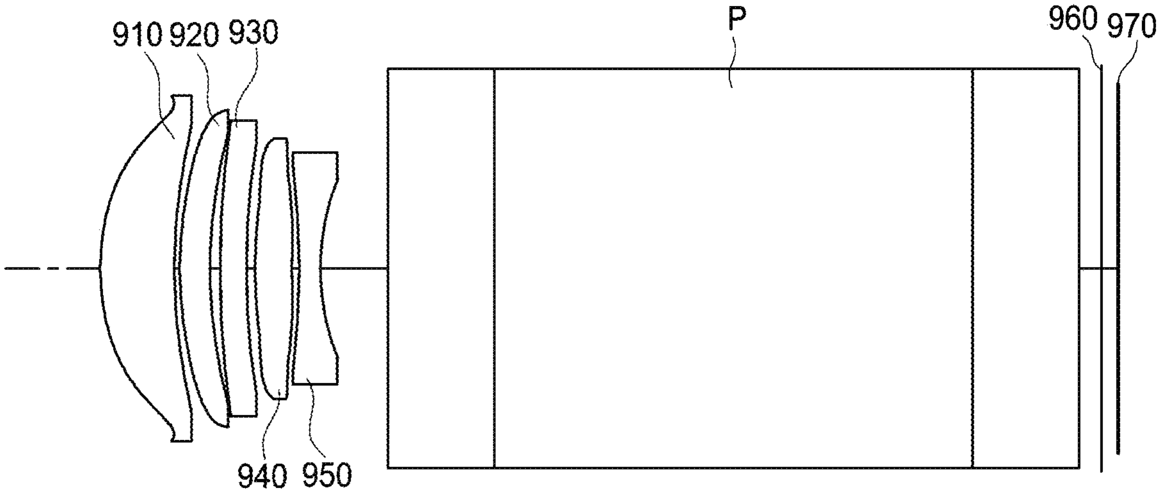
FIG. 17 is a configuration diagram of an optical imaging system according to a ninth embodiment of the present disclosure.

An optical imaging system according to a ninth embodiment of the present disclosure will be described with reference to FIGS. 17 and 18.

The optical imaging system according to the ninth embodiment of the present disclosure may include an optical system including a first lens 910, a second lens 920, a third lens 930, a fourth lens 940, and a fifth lens 950, and may further include a filter 960 and an image sensor.

The optical imaging system according to the ninth embodiment of the present disclosure may form a focus on an imaging plane 970. The imaging plane 970 may refer to a surface on which a focus is formed by an optical imaging system. For example, the imaging plane 970 may refer to one surface of an image sensor through which light is received.

The optical imaging system may further include a reflective member P disposed between the fifth lens 950 and the imaging plane 970, and having a plurality of reflective surfaces for changing an optical path. For example, the reflective member P includes a first reflective surface P1 and a second reflective surface P2. The reflective member P may be a prism, but may also be provided as a mirror.

Lens characteristics of each lens (radius of curvature, thickness of lens or distance between lenses, refractive index, Abbe number, and focal length) are illustrated in Table 17.

TABLE 17

| Surface No. | Reference | Radius of curvature | Thickness or distance | Refractive index | Abbe number | Focal length |
|---|---|---|---|---|---|---|
| S1 | First lens | 5.309 | 1.747 | 1.498 | 81.6 | 15.4335 |
| S2 | | 15.278 | 0.100 | | | |
| S3 | Second lens | 8.923 | 0.726 | 1.677 | 19.2 | 34.1972 |
| S4 | | 14.044 | 0.251 | | | |
| S5 | Third lens | 52.808 | 0.620 | 1.619 | 26.0 | −45.0663 |
| S6 | | 18.177 | 0.180 | | | |
| S7 | Fourth lens | 11.238 | 0.856 | 1.537 | 55.7 | 15.0786 |
| S8 | | −28.120 | 0.180 | | | |
| S9 | Fifth lens | −23.736 | 0.500 | 1.619 | 26.0 | −8.3865 |
| S10 | | 6.702 | 1.500 | | | |
| S11 | Reflective | Infinity | 2.500 | 1.518 | 64.2 | |
| S12 | member | Infinity | 11.250 | 1.518 | 64.2 | |
| S13 | | Infinity | 2.500 | 1.518 | 64.2 | |
| S14 | | Infinity | 0.500 | | | |
| S15 | Filter | Infinity | 0.000 | 1.518 | 64.2 | |
| S16 | | Infinity | 0.400 | | | |
| S17 | Imaging plane | Infinity | | | | |

According to the ninth embodiment of the present disclosure, a total focal length f is 20.6629 mm, a combined focal length f23 of the first lens 910 and the second lens 920 is 120.107 mm, a field of view (FOV) is 24.24°, and an Fno is 2.9.

In the ninth embodiment of the present disclosure, the first lens 910 has positive refractive power, a first surface of the first lens 910 is convex, and a second surface of the first lens 910 is concave. The second lens 920 has positive refractive power, a first surface of the second lens 920 is convex, and a second surface of the second lens 920 is concave. The third lens 930 has negative refractive power, a first surface of the third lens 930 is convex, and a second surface of the third lens 930 is concave. The fourth lens 940 has positive refractive power, and a first surface and a second surface of the fourth lens 940 are convex. The fifth lens 950 has negative refractive power, and a first surface and a second surface of the fifth lens 950 are concave.

According to the ninth embodiment of the present disclosure, each surface of the fourth lens 940 and the fifth lens 950 has an aspherical surface coefficient as illustrated in Table 18. For example, the object-side surface of the fourth lens 940 and the image-side surface of the fifth lens 950 are aspherical.

TABLE 18

| | S1 | S2 | S3 | S4 | S5 |
|---|---|---|---|---|---|
| Conic constant(K) | 0.000 | 0.000 | 0.000 | 0.000 | 0.000 |
| $4^{th}$ coefficient(A) | 0.000 | 0.000 | 0.000 | 0.000 | 0.000 |
| $6^{th}$ coefficient(B) | 0.000 | 0.000 | 0.000 | 0.000 | 0.000 |
| $8^{th}$ coefficient(C) | 0.000 | 0.000 | 0.000 | 0.000 | 0.000 |
| $10^{th}$ coefficient(D) | 0.000 | 0.000 | 0.000 | 0.000 | 0.000 |

TABLE 18-continued

| | S6 | S7 | S8 | S9 | S10 |
|---|---|---|---|---|---|
| Conic constant(K) | 0.000 | −7.041 | 0.000 | 0.000 | 2.511 |
| $4^{th}$ coefficient(A) | 0.000 | 5.7406E−02 | 0.000 | 0.000 | −2.6976E−02 |
| $6^{th}$ coefficient(B) | 0.000 | 2.7334E−02 | 0.000 | 0.000 | −1.1861E−02 |
| $8^{th}$ coefficient(C) | 0.000 | 2.3004E−03 | 0.000 | 0.000 | 6.1575E−03 |
| $10^{th}$ coefficient(D) | 0.000 | −2.3473E−04 | 0.000 | 0.000 | 6.7858E−03 |

Figure 18:
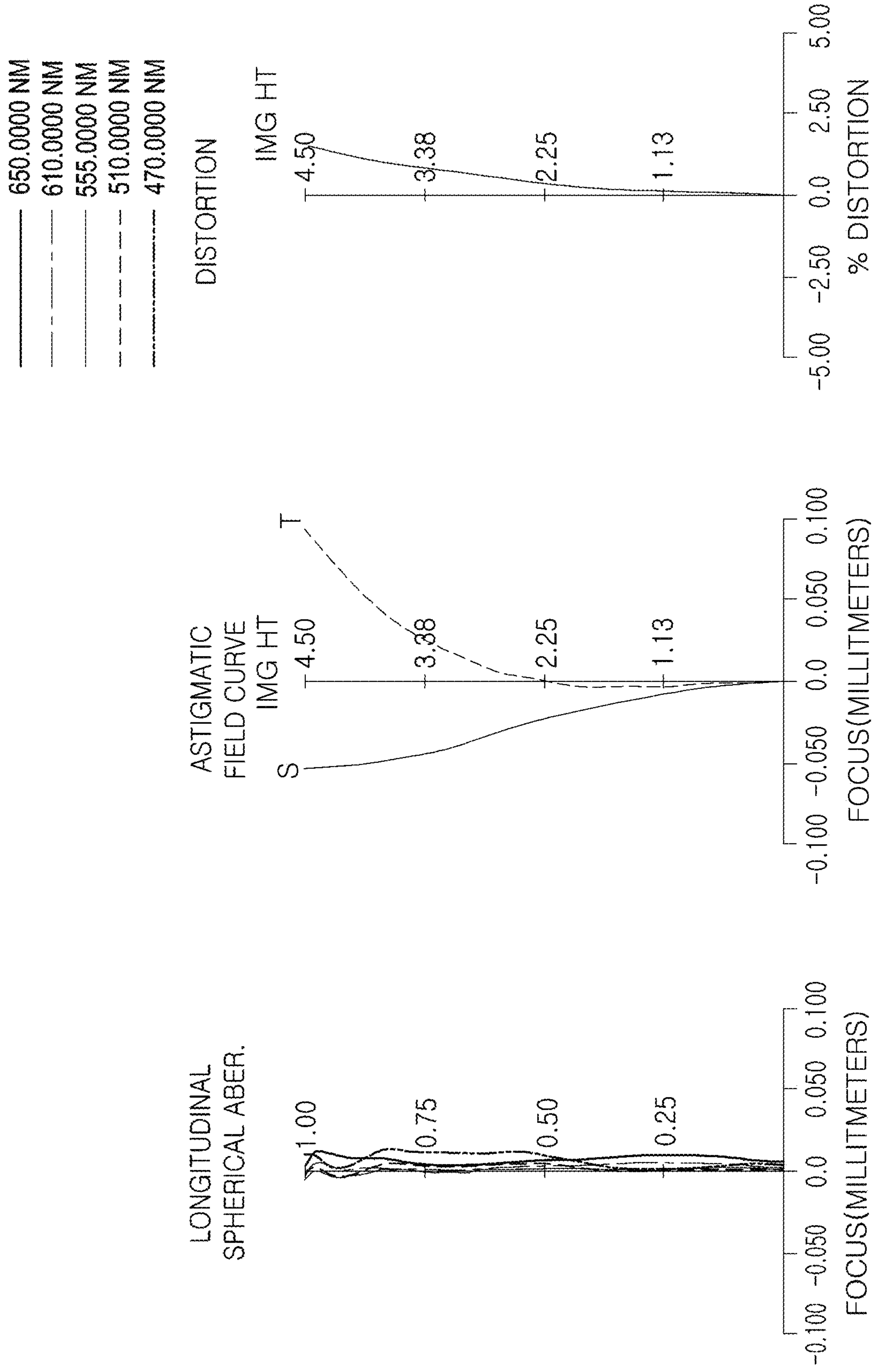
FIG. 18 is a diagram illustrating aberration characteristics of the optical imaging system illustrated in FIG. 17.

In addition, the optical imaging system configured as described above may have aberration characteristics illustrated in FIG. 18.

Figure 19:
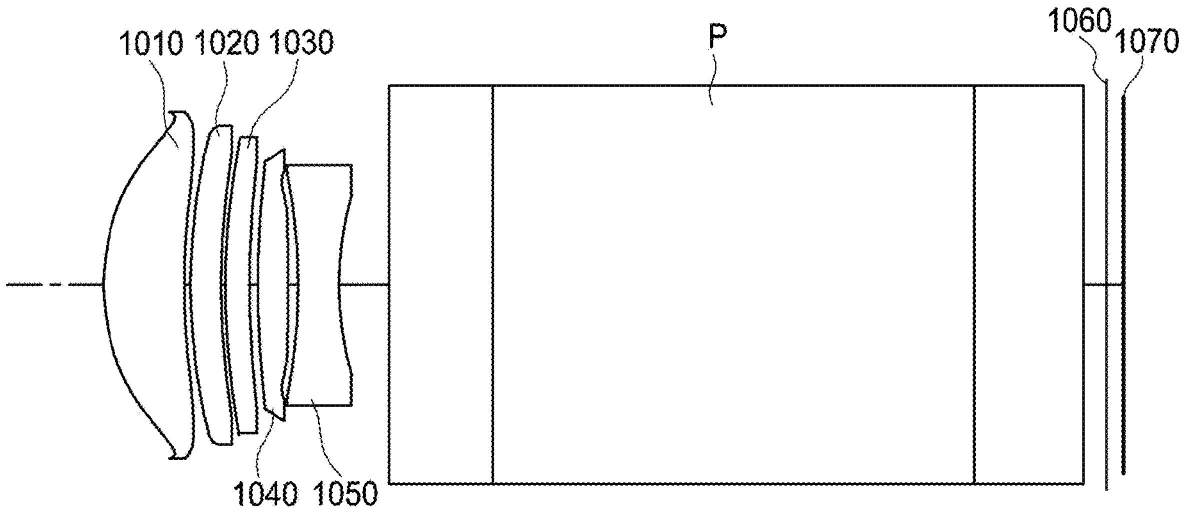
FIG. 19 is a configuration diagram of an optical imaging system according to a tenth embodiment of the present disclosure.

An optical imaging system according to a tenth embodiment of the present disclosure will be described with reference to FIGS. 19 and 20.

The optical imaging system according to the tenth embodiment of the present disclosure may include an optical system including a first lens 1010, a second lens 1020, a third lens 1030, a fourth lens 1040, and a fifth lens 1050, and may further include a filter 1060 and an image sensor.

The optical imaging system according to the tenth embodiment of the present disclosure may form a focus on an imaging plane 1070. The imaging plane 1070 may refer to a surface on which a focus is formed by an optical imaging system. For example, the imaging plane 1070 may refer to one surface of an image sensor through which light is received.

The optical imaging system may further include a reflective member P disposed between the fifth lens 1050 and the imaging plane 1070, and having a plurality of reflective surfaces for changing an optical path. For example, the reflective member P includes a first reflective surface P1 and a second reflective surface P2. The reflective member P may be a prism, but it may also be provided as a mirror.

Lens characteristics of each lens (radius of curvature, thickness of lens or distance between lenses, refractive index, Abbe number, and focal length) are illustrated in Table 19.

TABLE 19

| Surface No. | Reference | Radius of curvature | Thickness or distance | Refractive index | Abbe number | Focal length |
|---|---|---|---|---|---|---|
| S1 | First lens | 5.368 | 1.900 | 1.537 | 55.7 | 12.244 |
| S2 | | 25.735 | 0.100 | | | |
| S3 | Second lens | 12.497 | 0.722 | 1.677 | 19.2 | 47.6522 |
| S4 | | 19.924 | 0.170 | | | |
| S5 | Third lens | −363.201 | 0.499 | 1.619 | 26.0 | −31.8721 |
| S6 | | 20.882 | 0.180 | | | |
| S7 | Fourth lens | 13.689 | 0.717 | 1.537 | 55.7 | 15.9344 |
| S8 | | −22.356 | 0.201 | | | |
| S9 | Fifth lens | −17.746 | 0.908 | 1.619 | 26.0 | −8.3985 |
| S10 | | 7.501 | 1.200 | | | |
| S11 | Reflective | Infinity | 2.500 | 1.518 | 64.2 | |
| S12 | member | Infinity | 11.250 | 1.518 | 64.2 | |
| S13 | | Infinity | 2.500 | 1.518 | 64.2 | |
| S14 | | Infinity | 0.500 | | | |
| S15 | Filter | Infinity | 0.000 | 1.518 | 64.2 | |
| S16 | | Infinity | 0.400 | | | |
| S17 | Imaging plane | Infinity | | | | |

According to the tenth embodiment of the present disclosure, a total focal length f is 20.6295 mm, a combined focal length f23 of the first lens 1010 and the second lens 1020 is −106.897 mm, a field of view (FOV) is 24.71°, and an Fno is 2.8.

In the tenth embodiment of the present disclosure, the first lens 1010 has positive refractive power, a first surface of the first lens 1010 is convex, and a second surface of the first lens 1010 is concave. The second lens 1020 has positive refractive power, a first surface of the second lens 1020 is convex, and a second surface of the second lens 1020 is concave. The third lens 1030 has negative refractive power, and a first surface and a second surface of the third lens 1030 are concave. The fourth lens 1040 has positive refractive power, and a first surface and a second surface of the fourth lens 1040 are convex. The fifth lens 1050 has negative refractive power, and a first surface and a second surface of the fifth lens 1050 are concave.

According to the tenth embodiment of the present disclosure, each surface of the fourth lens 1040 and the fifth lens 1050 has an aspherical surface coefficient as illustrated in Table 20. For example, the object-side surface of the fourth lens 1040 and the image-side surface of the fifth lens 1050 are aspherical.

TABLE 20

| | S1 | S2 | S3 | S4 | S5 |
|---|---|---|---|---|---|
| Conic constant(K) | 0.000 | 0.000 | 0.000 | 0.000 | 0.000 |
| $4^{th}$ coefficient(A) | 0.000 | 0.000 | 0.000 | 0.000 | 0.000 |
| $6^{th}$ coefficient(B) | 0.000 | 0.000 | 0.000 | 0.000 | 0.000 |
| $8^{th}$ coefficient(C) | 0.000 | 0.000 | 0.000 | 0.000 | 0.000 |
| $10^{th}$ coefficient(D) | 0.000 | 0.000 | 0.000 | 0.000 | 0.000 |

| | S6 | S7 | S8 | S9 | S10 |
|---|---|---|---|---|---|
| Conic constant(K) | 0.000 | −7.474 | 0.000 | 0.000 | 2.922 |
| $4^{th}$ coefficient(A) | 0.000 | 5.4355E−02 | 0.000 | 0.000 | −5.5165E−02 |
| $6^{th}$ coefficient(B) | 0.000 | 2.5566E−02 | 0.000 | 0.000 | −9.8109E−03 |
| $8^{th}$ coefficient(C) | 0.000 | 2.6907E−03 | 0.000 | 0.000 | 5.1140E−03 |
| $10^{th}$ coefficient(D) | 0.000 | 4.1402E−05 | 0.000 | 0.000 | 6.9618E−03 |

Figure 20:
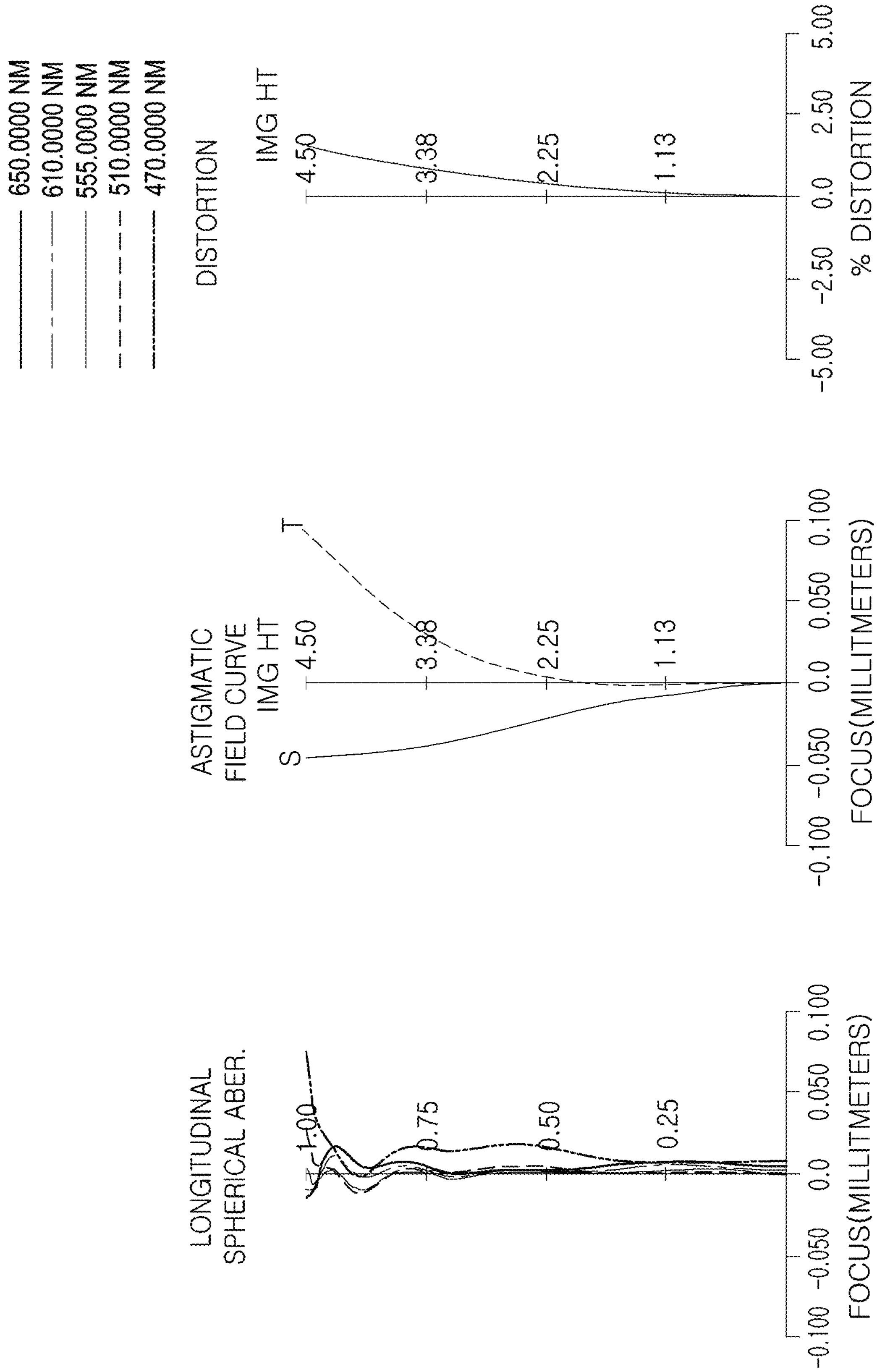
FIG. 20 is a diagram illustrating aberration characteristics of the optical imaging system illustrated in FIG. 19.

In addition, the optical imaging system configured as described above may have aberration characteristics illustrated in FIG. 20.

As set forth above, according to an optical lens system according to one or more embodiments of the present disclosure, a size of the optical imaging system may be reduced, and a high-resolution image may be captured.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:

a first lens having positive refractive power and a convex object-side surface;

a second lens having refractive power;

a third lens having refractive power;

a fourth lens having refractive power;

a fifth lens having refractive power, wherein the first to fifth lenses are sequentially disposed; and a reflective member having a plurality of reflective surfaces to reflect the light refracted by the fifth lens multiple times, wherein the optical imaging system has a total of five lenses, wherein $1.3<f/f1<2.1$ and $1.63<avg\_n23<1.7$ are satisfied, where f is a total focal length of the first to fifth lenses, f1 is a focal length of the first lens, and avg_n23 is an average value of a refractive index of the second lens and a refractive index of the third lens, and wherein $0<f1/|f23|<0.3$ is satisfied, where f23 is a combined focal length of the second lens and the third lens.

2. The optical imaging system of claim 1, wherein $3<BFL/TL<7$ is satisfied, where BFL is a distance on an optical axis from an image-side surface of the fifth lens to an imaging plane, and TL is a distance on an optical axis from the object-side surface of the first lens to the image-side surface of the fifth lens.

3. The optical imaging system of claim 1, wherein $1<TTL/BFL<2$ is satisfied, where TTL is a distance on an optical axis from the object-side surface of the first lens to an imaging plane, and BFL is a distance on an optical axis from an image-side surface of the fifth lens to the imaging plane.

4. The optical imaging system of claim 1, wherein the reflective member comprises an incident surface into which light refracted by the fifth lens is incident, a first reflective surface for reflecting the light, a second reflective surface for reflecting the light reflected from the first reflective surface, and an emission surface from which light reflected from the second reflective surface is emitted, wherein $PL/TTL<0.8$ is satisfied, where PL is a distance on an optical axis from the incident surface of the reflective member to the emission surface, and TTL is a distance on an optical axis from the object-side surface of the first lens to an imaging plane.

5. The optical imaging system of claim 1, wherein $|f1/f2|<0.6$ is satisfied, where f2 is a focal length of the second lens.

6. The optical imaging system of claim 1, wherein $1<TTL/f<1.5$ is satisfied, where TTL is a distance on an optical axis from the object-side surface of the first lens to an imaging plane.

7. The optical imaging system of claim 1, wherein $2.7<Fno<4.6$ is satisfied, where Fno is an F-number of the optical imaging system.

8. The optical imaging system of claim 1, wherein $9<v1-(v2+v3)<37$ is satisfied, where v1 is an Abbe number of the first lens, v2 is an Abbe number of the second lens, and v3 is an Abbe number of the third lens.

9. The optical imaging system of claim 1, wherein each of the second lens and the third lens has a refractive index greater than 1.61 and an Abbe number less than 30.

10. The optical imaging system of claim 9, wherein any one of the second lens and the third lens has a refractive index greater than 1.66.

11. The optical imaging system of claim 10, wherein a difference value of Abbe numbers between the first lens and the second lens is greater than 29, and a difference value of Abbe numbers between the second lens and the third lens is less than 7.

12. The optical imaging system of claim 1, wherein the first lens is formed of a glass material having an Abbe number greater than 80, and the second to fifth lenses are formed of a plastic material.

13. The optical imaging system of claim 1, wherein the first lens is formed of a glass material having an Abbe number greater than 80, the second lens is formed of a glass material having an Abbe number less than 30, and the third to fifth lenses are formed of a plastic material.

14. The optical imaging system of claim 1, wherein the second lens has a convex object-side surface and a concave image-side surface.

15. The optical imaging system of claim 1, wherein the third lens has negative refractive power.

16. The optical imaging system of claim 1, wherein the fifth lens has negative refractive power and a concave image-side surface.

* * * * *